(12) United States Patent
Ukawa

(10) Patent No.: US 8,957,922 B2
(45) Date of Patent: Feb. 17, 2015

(54) DISPLAY APPARATUS AND METHOD FOR CONTROLLING THE SAME

(75) Inventor: Satoshi Ukawa, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 13/493,298

(22) Filed: Jun. 11, 2012

(65) Prior Publication Data

US 2013/0002619 A1 Jan. 3, 2013

(30) Foreign Application Priority Data

Jun. 30, 2011 (JP) ................................. 2011-145642
Apr. 9, 2012 (JP) ................................. 2012-088659

(51) Int. Cl.
| | |
|---|---|
| G09G 5/00 | (2006.01) |
| G06F 3/041 | (2006.01) |
| H04N 1/60 | (2006.01) |
| G06F 3/14 | (2006.01) |
| G09G 3/34 | (2006.01) |
| G09G 3/36 | (2006.01) |

(52) U.S. Cl.
CPC ............. G09G 5/003 (2013.01); G06F 3/0418 (2013.01); H04N 1/6036 (2013.01); G06F 3/14 (2013.01); G09G 3/3406 (2013.01); G09G 3/3611 (2013.01); G09G 2320/0693 (2013.01); G09G 2320/08 (2013.01); G09G 2360/145 (2013.01); G09G 2370/022 (2013.01); G09G 2370/04 (2013.01); G09G 2380/08 (2013.01)

USPC .......................................................... 345/690

(58) Field of Classification Search
None
See application file for complete search history.

(56) References Cited

U.S. PATENT DOCUMENTS

| | | | |
|---|---|---|---|
| 7,839,457 B2 * | 11/2010 | Yamagata et al. | 348/687 |
| 8,345,060 B2 * | 1/2013 | Hilliard et al. | 345/589 |
| 2008/0309822 A1 * | 12/2008 | Park | 348/564 |

FOREIGN PATENT DOCUMENTS

| | | |
|---|---|---|
| JP | 2002-057911 | 2/2002 |
| JP | 2005-208548 | 8/2005 |

\* cited by examiner

*Primary Examiner* — Joseph Haley
(74) *Attorney, Agent, or Firm* — Cowan, Liebowitz & Latman, P.C.

(57) ABSTRACT

A display apparatus that can execute single unit calibration that is performed by displaying an image stored in the display apparatus in advance, and link calibration that is performed by displaying an image based on an image signal which is input from an external apparatus, comprises an execution unit that performs periodic calibration in which the single unit calibration and the link calibration are periodically executed and a determination unit that determines whether an image signal from the external apparatus is input or not, wherein the execution unit executes the link calibration during a period in which the determination unit determines that an image signal from the external apparatus is input, when the link calibration could not be executed during the periodic calibration.

10 Claims, 21 Drawing Sheets

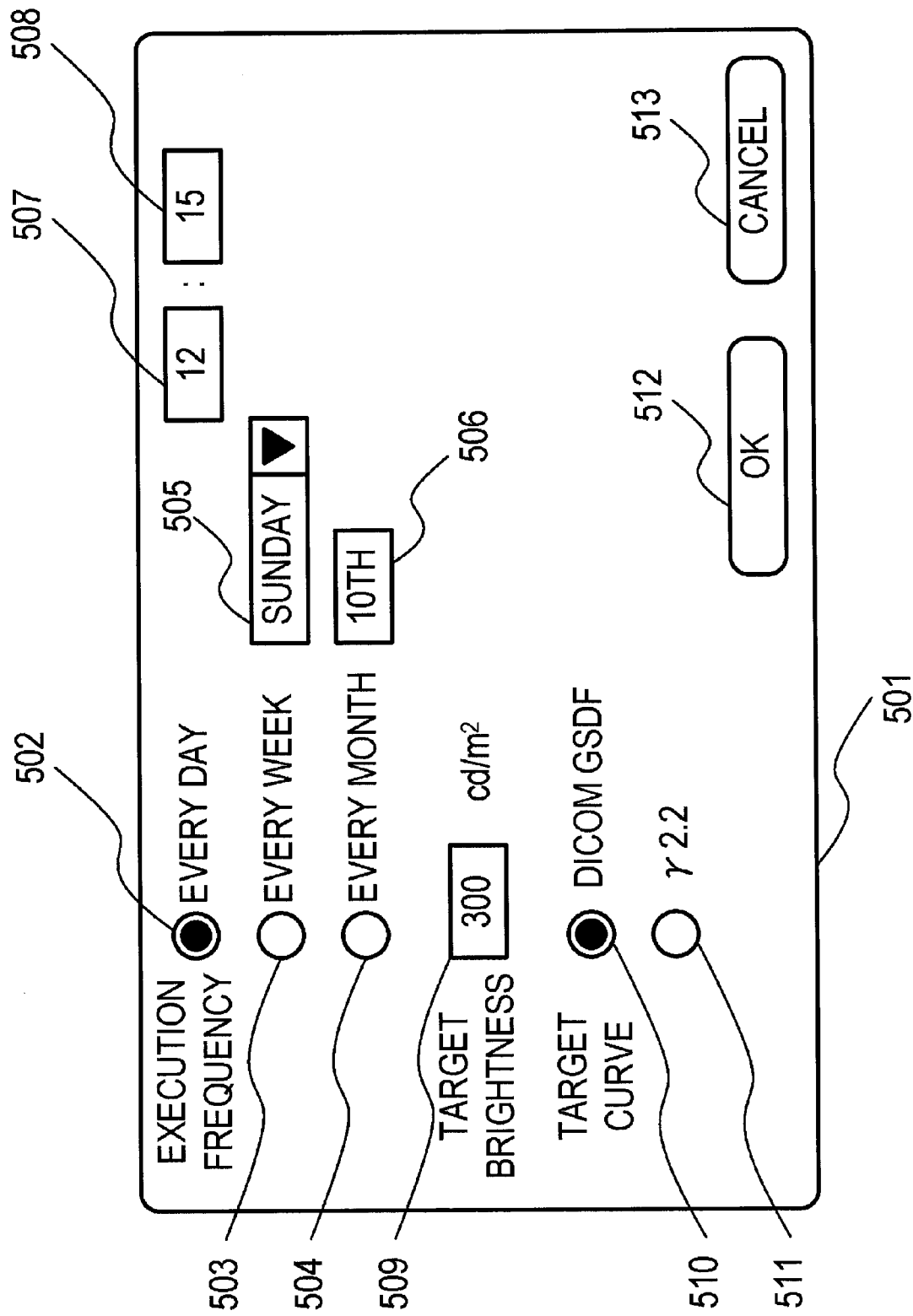

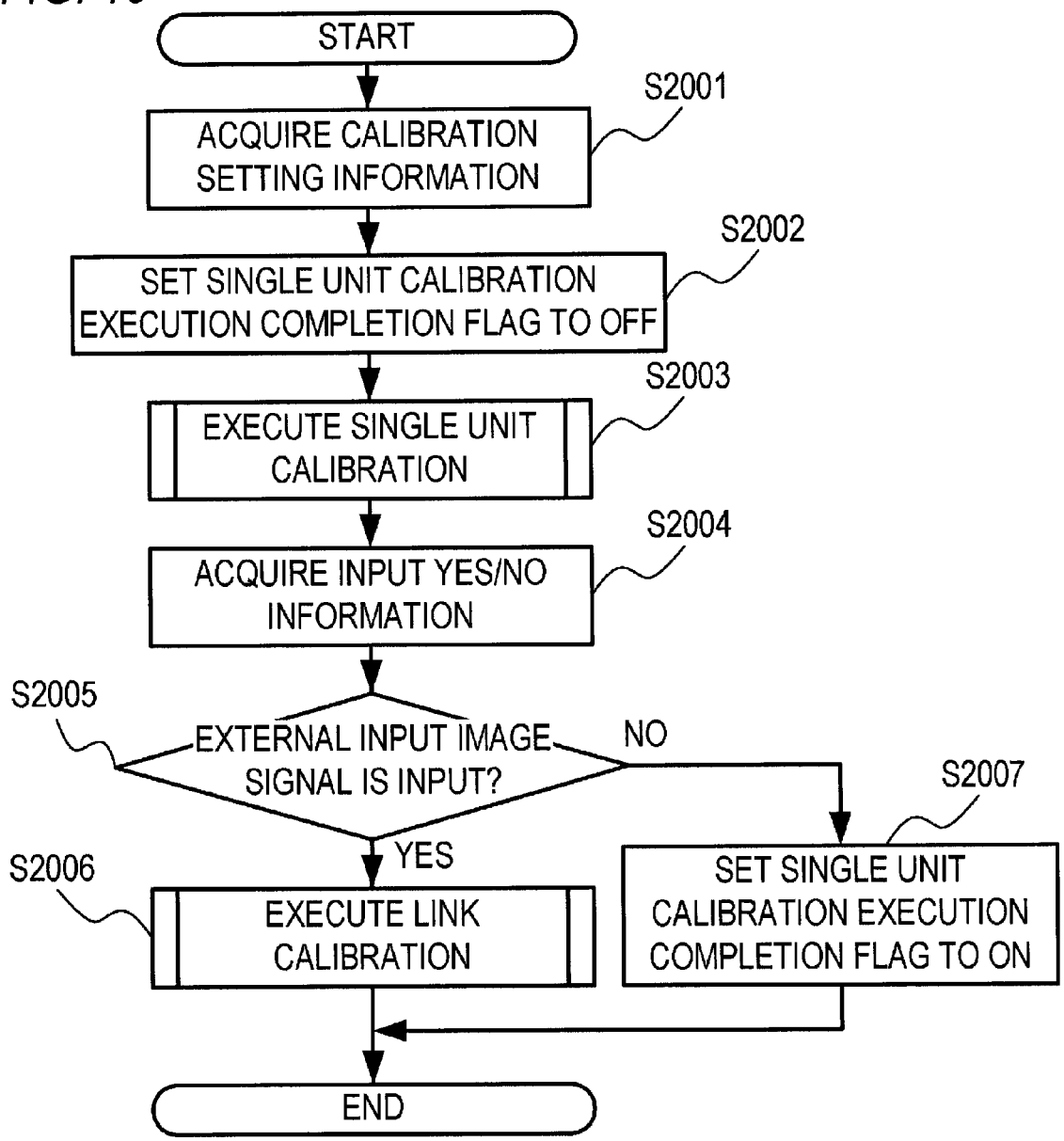

DISPLAY APPARATUS AND METHOD FOR CONTROLLING THE SAME

BACKGROUND OF THE INVENTION

1. Field of the Invention

The present invention relates to a display apparatus and a method for controlling the display apparatus.

2. Description of the Related Art

A high definition medical monitor (display apparatus for displaying medical images) generally displays medical images which are output from such an external apparatus as a PC (Personal Computer). However in future it is expected that the functions of medical monitors will be more advanced, and medical monitors, which can easily display medical images on medical monitors alone, will be developed. And as such medical monitors, the development of portable monitors (display apparatuses) is expected. If this type of medical monitor is used, the images can be read using a high functioning PC (software stored on PC) and monitor, and explanations to patients, for example, can be performed using the monitor alone (simply displaying the medical images on the monitor alone). It is also expected that such a medical monitor will be connected to a network for displaying images. Furthermore it is expected that the calibration schedule setting and calibration execution instructions via a network, now performed on a PC, will be performed on the monitor.

In the case of the above mentioned monitor, the view of displayed images (display characteristics) must conform to a target value. However an image that is input from a PC (hereafter "external input image") may change depending on the characteristics of the graphic board provided in the PC or the processing performed in the PC (e.g. image processing executed in the PC). In other words, the display characteristics of an external input image and those of an image displayed by a monitor alone (single unit display image) may differ even if a same image is displayed. Therefore as the display characteristic calibration, the display characteristic calibration of the external input image (hereafter "link calibration") and the display characteristic calibration of the single unit display image (hereafter "single unit calibration") must be performed.

A prior art on the calibration is disclosed in Japanese Patent Application Laid-Open No. 2002-057911 and Japanese Patent Application Laid-Open No. 2005-208548. In concrete terms, Japanese Patent Application Laid-Open No. 2002-057911 discloses a technique to correct the result of software-based calibration according to the result of the device calibration. Software-based calibration is performed using the data acquired by reading the printed result of a printer using a scanner. Device calibration is automatically performed in the printer based on the potential of a latent image formed on a photosensitive drum and the density of a toner image.

Japanese Patent Application Laid-Open No. 2005-208548 discloses a technique to perform photometry using a photometric unit disposed to face a liquid crystal display unit, and perform calibration based on the difference value between the result of the photometry and a predetermined ideal value.

According to a guideline for the quality control of medical monitors, it is demanded that a constancy test be performed on a monitor periodically, and calibration is performed if the test result indicates failure (if the constancy of the display characteristics of a monitor is diminished). Therefore software for automatically calibrating a medical monitor according to a predetermined schedule, and software for executing calibration of a medical monitor via a network are sold in the marketplace.

SUMMARY OF THE INVENTION

However the link calibration cannot be performed unless a monitor and PC are connected. Therefore in some cases the link calibration may not be performed at a timing according to a predetermined schedule, or at a timing instructed from the network. In other words, the display characteristics of the external input image and those of the single unit display image may differ, since the display characteristics of the external input image cannot conform to the target value.

The present invention provides a technique to calibrate the display characteristics of an image based on an image signal that is input from an external apparatus and those of an image displayed on a monitor alone at an appropriate timing, so as to prevent the display characteristics of those images from becoming different from each other.

A display apparatus, according to the present invention, that can execute single unit calibration that is performed by displaying an image stored in the display apparatus in advance, and link calibration that is performed by displaying an image based on an image signal which is input from an external apparatus, comprises:

an execution unit that performs periodic calibration in which the single unit calibration and the link calibration are periodically executed; and a determination unit that determines whether an image signal from the external apparatus is input or not, wherein the execution unit executes the link calibration during a period in which the determination unit determines that an image signal from the external apparatus is input, when the link calibration could not be executed during the periodic calibration.

A method for controlling a display apparatus, according to the present invention, that can execute single unit calibration that is performed by displaying an image stored in the display apparatus in advance, and link calibration that is performed by displaying an image based on an image signal which is input from an external apparatus, the method comprises:

an execution step of performing periodic calibration in which the single unit calibration and the link calibration are periodically executed; and a determination step of determining whether an image signal from the external apparatus is input or not, wherein in the execution step, the link calibration is executed during the period in which determination is made that an image signal from the external apparatus is input in the determination step, when the link calibration could not be executed during the periodic calibration.

According to the present invention, the display characteristics of an image based on image signal that is input from an external apparatus and those of an image displayed on a monitor alone can be calibrated at an appropriate timing, so as to prevent the display characteristics of those images from becoming different from each other.

Further features of the present invention will become apparent from the following description of exemplary embodiments with reference to the attached drawings.

BRIEF DESCRIPTION OF THE DRAWINGS

FIG. 5 illustrates an example of the setting window according to Example 1;

FIG. 19 is a flow chart depicting an example of the periodic calibration execution processing according to Example 3.

DESCRIPTION OF THE EMBODIMENTS

A display apparatus and a method for controlling the display apparatus according to Example 1 of the present invention will be described. The display apparatus according to this example can execute the single unit calibration and the link calibration. The single unit calibration is performed by displaying an image stored in the display apparatus in advance. The link calibration is performed by displaying an image based on an image signal which is input from an external apparatus. A case when the external apparatus is a PC will be described herein below, but the external apparatus is not limited to a PC. The external apparatus can be any apparatus that outputs an image signal to a display apparatus, such as a hard disk recorder, a Blu-ray recorder, a display apparatus which can externally output data, and a game machine. A case when an image displayed upon executing calibration is a patch image will be described herein below, but the image displayed upon executing calibration is not limited to a patch image. The image displayed upon executing calibration may also be a predetermined pattern image, for example.

Example 1

Figure 1:
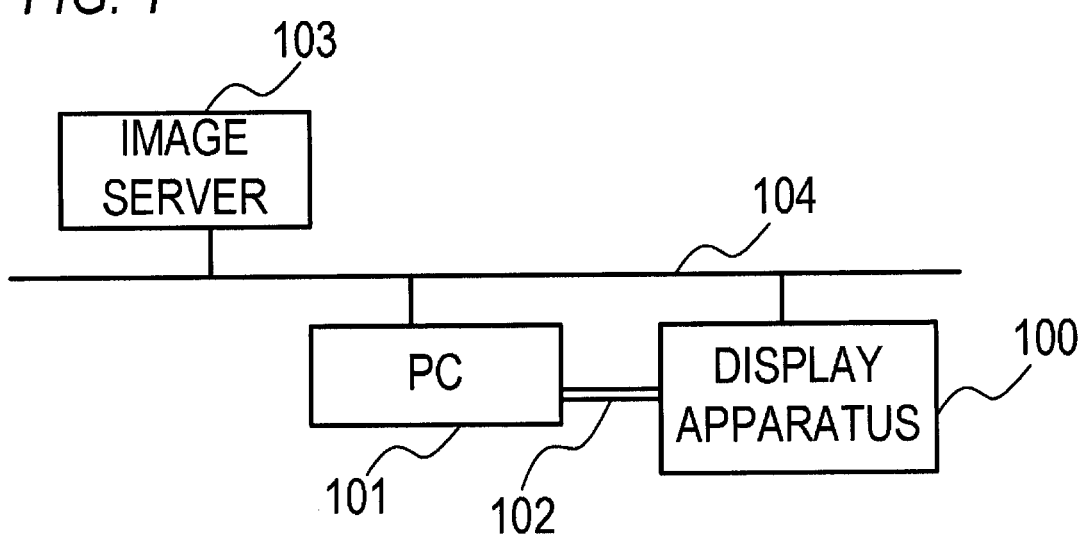
FIG. 1 illustrates an example of a display system according to Example 1.

FIG. 1 is a diagram depicting an example of the display system according to Example 1 of the present invention. As FIG. 1 illustrates, the display system according to this example has a display apparatus 100 (monitor), a PC 101 and an image server 103.

The display apparatus 100 and the PC 101 are interconnected via an image cable 102. The image cable 102 is a cable conforming to the DVI (registered trademark) or Display Port (registered trademark) standard, and is a cable that can transmit image signals and signals based on DDC/CI (Display Data Channel Command Interface).

The display apparatus 100 and the PC 101 are connected to the image server 103 using the network cable 104.

The display apparatus 100 displays an image based on an image signal or image file data which are input. For example, the display apparatus 100 displays an image based on an image signal which is output from the PC 101 (external input image). The display apparatus 100 also acquires image file data (image file data in JPEG, RAW or other format) from the image server 103 based on the user operation. The display apparatus 100 decodes the acquired image file data and displays an image based on this image file data (single unit display image).

The display apparatus 100 transmits such a control signal as a patch transmission request signal to the PC 101. The patch transmission request signal is a signal to indicate a request for transmission of a patch image signal (external patch signal).

According to the patch transmission request signal from the display apparatus 100, the PC 101 transmits an external patch signal and a response signal, such as a signal to indicate completion of transmission of the external patch signal (patch transmission completion signal) to the display apparatus 100. When the transmission of the external patch signal completes, the complete patch image (external patch image) based on this external patch signal is displayed on the display apparatus 100. Therefore the patch transmission completion signal can be regarded as a signal to indicate completion of display of the external patch image. The PC 101 acquires image file data (image file data in JPEG, RAW or other format) from the image server 103 based on the user operation. The PC 101 generates an image signal by decoding the acquired image file data, performs predetermined processing on the image signal if necessary, and outputs the image signal to the display apparatus 100.

Figure 2A:
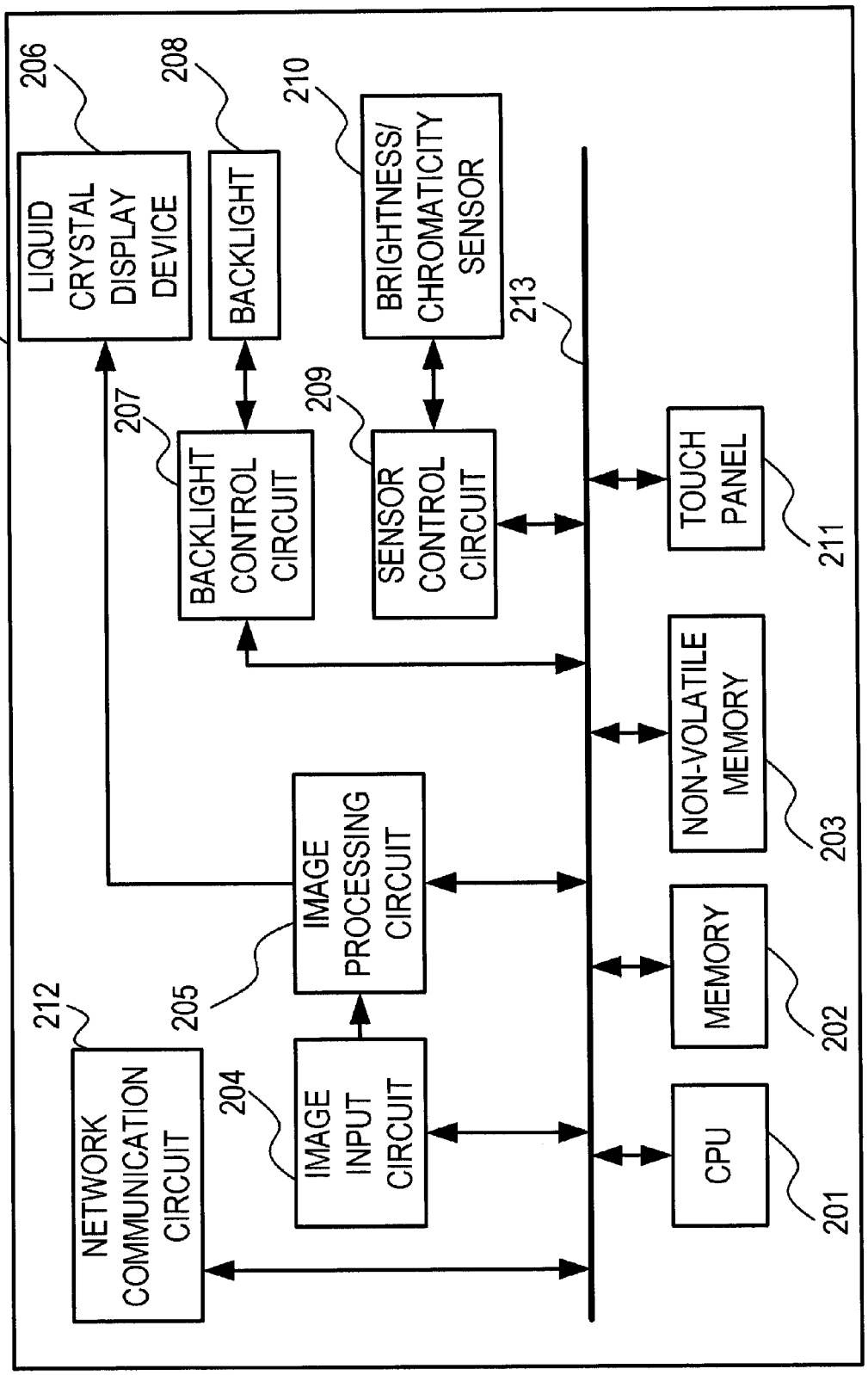
FIG. 2A and FIG. 2B are hardware block diagrams depicting an example of the display apparatus according to Example 1.
Figure 2B:
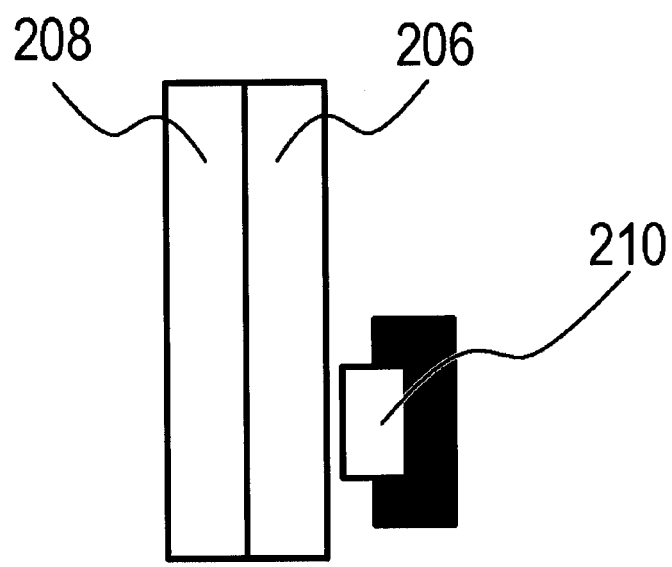

FIG. 2A is an example of a hardware block diagram of the display apparatus 100. FIG. 2B illustrates an example of a cross-section (cross-section obtained by a plane vertical to the screen) of the display apparatus 100, sectioned near the brightness/chromaticity sensor 210.

A CPU 201 reads programs for performing various controls from a non-volatile memory 203, and controls each configuration block connected to an internal bus 213.

For example, the CPU 201 performs periodic calibration in which single unit calibration and link calibration are executed periodically based on the calibration setting information recorded in the non-volatile memory 203. Details on the single unit calibration and the link calibration will be described later. The calibration setting information is information that includes the target values (target maximum brightness value, target gradation curve) and the execution schedule of the periodic calibration.

If the calibration setting information is set by user operation, the CPU 201 records (overwrites) the calibration setting information which is set here in the non-volatile memory 203. The user operates the display apparatus 100 using a touch panel 211, for example.

The CPU 201 also executes image display applications (e.g. image viewer) based on user operation.

Furthermore the CPU 201 acquires image file data from the image server 103 via a network communication circuit 212, decodes the image file data, and generates an image signal (single unit display image signal) based on the user operation for the image display application. Then the CPU 201 performs image processing on the generated single unit display image signal if necessary, and outputs the signal to an image processing circuit 205. In concrete terms, image signals that represent images, including an image based on the single unit display image signal (single unit display image) and an image of the image display application, are generated and output to the image processing circuit 205.

A memory 202 temporarily stores data used for processing by the CPU 201.

The non-volatile memory 203 stores programs used by the CPU 201, backlight emission parameter, an image quality adjustment parameters and calibration setting information among others. A backlight emission parameter is a backlight brightness value for displaying an image, for example. An image quality adjustment parameter is a lookup table used for the image processing circuit 205 to perform image processing.

In this example, calibration of the display characteristics of the single unit display image (single unit calibration) and calibration of the display characteristics of an external input image (link calibration) are executed independently. Therefore in this example, two types of parameters, a parameter for single unit display image and a parameter for external input image are generated as the backlight emission parameter, and are stored in the non-volatile memory 203. Two types of parameters, a parameter for single unit display image and a parameter for external input image are generated as the image quality adjustment parameter, and are stored in the non-volatile memory 203.

Even if the original image file data of the single unit display image and that of the external input image are the same, the display characteristics of the single unit display image and those of the external input image are not always the same, since a predetermined processing may be performed by the PC on the signal of the external input image. Hence the display characteristics of the single unit display image and those of the external input image may not match in some cases by simply executing the above mentioned single unit calibration. This is why the single unit calibration and the link calibration are executed in this example.

It is preferable that a patch image used for the single unit calibration and a patch image used for the link calibration are the same. The display apparatus 100 and the PC 101 may acquire a same patch image from the image server 103 respectively. If the PC 101 does not have a same patch image as the patch image of the display apparatus 100, the patch image may be transmitted from the display apparatus 100 to the PC 101.

An image input circuit 204 receives an image signal (external input image signal (including an external patch signal)) from the PC 101, and outputs the image signal to the image processing circuit 205. The image input circuit 204 also transmits a control signal to the PC 101, and outputs a response signal received from the PC 101 to the CPU 201. Based on the image quality adjustment parameter recorded in the non-volatile memory 203, the image processing circuit 205 applies the image processing to the image signal received from the image input circuit 204 and the CPU 201, and outputs the image signals after applying image processing to a liquid crystal display device 206.

The liquid crystal display device 206 is a liquid crystal panel having a plurality of liquid crystal elements, and controls the transmittance of each liquid crystal element based on the image signals received from the image processing circuit 205.

A backlight control circuit 207 generates a backlight control signal for controlling the emission brightness of a backlight 208 based on backlight emission parameter recorded in the non-volatile memory 203 and outputs the backlight control signal.

The backlight 208 emits light based on the backlight control signal received from the backlight control circuit 207.

An image is displayed by the light from the backlight 208 transmitting through the liquid crystal elements of the liquid crystal display device 206.

A sensor control circuit 209 outputs a sensor control signal for controlling a brightness/chromaticity sensor 210 responding to a measurement request signal received from the CPU 201, and outputs the brightness and chromaticity measured by the brightness/chromaticity sensor 210 to the CPU 201. The measurement request signal is a signal to indicate a request to measure the brightness and chromaticity.

The brightness/chromaticity sensor 210 starts measuring the brightness and chromaticity responding to the reception of a sensor control signal from the sensor control circuit 209, and outputs the measurement results to the sensor control circuit 209. The brightness/chromaticity sensor 210 is disposed so as to face the screen (liquid crystal elements) as illustrated in FIG. 2B, and measures the brightness and chromaticity on the screen.

The touch panel 211 receives user operation input and notifies with a signal, according to the user operation, to the CPU 201.

The network communication circuit 212 transmits an image transmission request signal to the image server 103, and receives image file data.

Each configuration block of the liquid crystal display apparatus 100 performs data communication via the internal bus 213.

Figure 3:
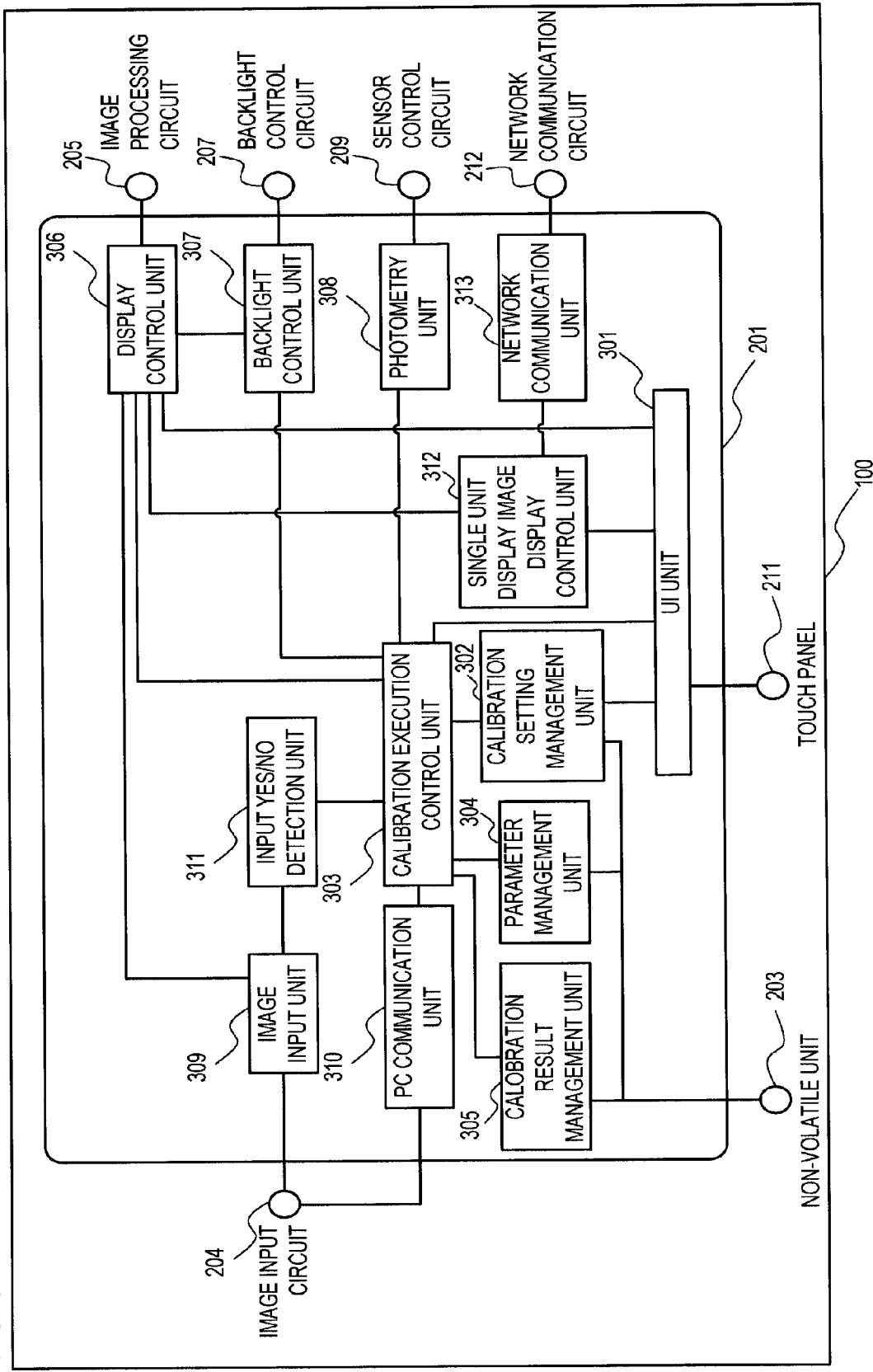
FIG. 3 is a functional block diagram depicting an example of the display apparatus according to Example 1.

FIG. 3 is a functional block diagram of the display apparatus 100.

If a user performs an operation to start setting the calibration setting information, a UI unit 301 acquires the current calibration setting information from a calibration setting management unit 302. Then the UI unit 301 generates a signal of a window (setting window) for setting calibration setting information, and outputs the signal. Thereby the setting window is displayed. If the user changes the calibration setting information thereafter out of necessity, and determines the calibration setting information, the UI unit 301 outputs the determined calibration setting information to the calibration setting management unit 302.

If the user performs operation to display a single unit display image, the UI unit 301 acquires image file data from the image server 103, and controls a unit display image display control unit 312 so that a unit display image signal is output.

The UI unit 301 also outputs a switching request signal to a display control unit 306 responding to user operation. The switching request signal is a signal to indicate a request to switch the display image. In this example, responding to the switching request signal, the display image is switched between an external input image, which is based on an external input image signal from an image input unit 309, and a single unit display image, which is based on a single unit display image signal from the single unit display image display control unit 312. Responding to the switching request signal, the display image may be switched to an image other than the single unit display image and the external input image.

The calibration setting management unit 302 reads the calibration setting information from the non-volatile memory 203 responding to the request from the UI unit 301 or a calibration execution control unit 303, and outputs the calibration setting information to the source which transmitted this request. The calibration setting management unit 302 also records (overwrites) the calibration setting information transmitted from the UI unit 301 in the non-volatile memory 203.

The calibration execution control unit 303 acquires the calibration setting information from the calibration setting management unit 302. The calibration execution control unit 303 performs a periodic calibration in which the single unit calibration and the link calibration are executed periodically (according to the schedule set by the user, in the case of this example). At this time, the calibration execution control unit 303 determines whether the link calibration is performed based on the input YES/NO information acquired from an input YES/NO detection unit 311. The input YES/NO information is a signal to indicate whether an external input image signal is input or not (result of determination by the input YES/NO detection unit 311 whether an external input image signal is input). If it is determined that an external input image signal is not input from the PC 101 when the periodic calibration is performed, the calibration execution control unit 303 executes only the single unit calibration. If it is determined that an external input image signal is input from the PC 101 when the periodic calibration is performed, the calibration execution control unit 303 executes both the single unit calibration and the link calibration.

If only the single unit calibration is executed in the periodic calibration, the calibration execution control unit 303 executes the link calibration in a period when it is determined that an external input image signal is input, before the next periodic calibration. In concrete terms, when an input detection signal is received from the input YES/NO detection unit 311, the calibration execution control unit 303 determines whether the link calibration is executed or not based on the single unit calibration execution completion flag acquired from a calibration result management unit 305. The input detection signal is a signal to indicate that an external input image signal is input (signal that is output at a timing when the input YES/NO detection unit 311 determines that an external input image signal is input). The single unit calibration execution completion flag is a flag which is set to ON when only the single unit calibration is executed and the link calibration is not executed in the periodic calibration. When an input detection signal is received from the input YES/NO detection unit 311, the calibration execution control unit 303 executes the link calibration if the single unit calibration execution completion flag is ON (confirms whether the user wants to execute link calibration).

Details on the two determination processings will be described later.

If the single unit calibration is executed, the calibration execution control unit 303 outputs a pre-stored patch signal (internal patch signal) to the display control unit 306. Thereby a patch image (internal patch image) based on this internal patch signal is displayed. At this time, the calibration execution control unit 303 outputs a measurement request signal to a photometry unit 308. Then the calibration execution control unit 303 acquires the measurement result of the brightness/chromaticity sensor 210 (brightness and chromaticity of the displayed internal patch image) from the photometry unit 308. Based on the acquired brightness and chromaticity, the calibration execution control unit 303 calculates the image quality adjustment parameter and backlight emission parameter, and outputs the calculated parameters to the display control unit 306, the backlight control unit 307 and the parameter management unit 304. If only the single unit calibration is executed in the periodic calibration, the calibration execution control unit 303 outputs the single unit calibration execution completion flag "ON" to the calibration result management unit 305.

If the link calibration is executed, the calibration execution control unit 303 outputs a patch transmission request signal to a PC communication unit 310. Thereby an external patch signal is input from the PC 101, and an external patch image is displayed. At this time, the calibration execution control unit 303 outputs the measurement request signal to the photometry unit 308. Then just like the case of the single unit calibration, the calibration execution control unit 303 acquires the measurement result of the brightness/chromaticity sensor 210 (brightness and chromaticity of the displayed external patch image) from the photometry unit 308. Based on the acquired brightness and chromaticity, the calibration execution control unit 303 calculates the image quality adjustment parameter and backlight emission parameter, and outputs the calculated parameters to the display control unit 306, the backlight control unit 307 and the parameter management unit 304.

Details on the single unit calibration and the link calibration will be described later.

The parameters management unit 304 writes the backlight emission parameter and the image quality adjustment parameter, which are received from the calibration execution control unit 303, to the non-volatile memory 203.

According to the request from the calibration execution control unit 303, the calibration result management unit 305 reads the single unit calibration execution completion flag from the non-volatile memory 203. According to the request from the calibration execution control unit 303, the calibration result management unit 305 also writes (overwrites) the single unit calibration execution completion flag to the non-volatile memory 203.

The display control unit 306 selects either the external input image signal which the image input unit 309 outputs, or the single unit display image signal which the single unit display image display control unit 312 outputs, according to the switching request signal, and outputs the selected image signal to the image processing circuit 205. At this time, the display control unit 306 outputs an instruction to the image processing circuit 205 to use the image quality adjustment parameters corresponding to the selected image signal, and outputs an instruction to the backlight control unit 307 to use the backlight emission parameter corresponding to the selected image signal. Thereby the selected image signal is corrected by the image processing circuit 205, and an image based on the corrected image signal is displayed.

Furthermore the display control unit 306 generates a composite image signal by combining a signal of the setting window received from the UI unit 301 or a patch signal received from the calibration execution control unit 303 with the selected image signal, and outputs the generated composite image signal to the image processing circuit 205. The composite image signal is an image signal to indicate an image generated by combining the image based on the selected image signal and such an image as a setting window and a patch image.

The display control unit 306 outputs the image quality adjustment parameters, which are received from the calibration execution control unit 303 during calibration execution, to the image processing circuit 205.

The backlight control unit 307 outputs the parameter switching instruction (instruction to use the backlight emission parameter corresponding to the image signal selected by the display control unit 306) received from the display control unit 306 to the backlight control circuit 207. The backlight control unit 307 also outputs the backlight emission parameter, which is received from the calibration execution control unit 303 during calibration, to the backlight control circuit 207.

The photometry unit 308 outputs the measurement request signal received from the calibration execution control unit 303 to the sensor control circuit 209. The photometry unit 308 also acquires the measurement result (brightness and chromaticity) of the brightness/chromaticity sensor 210 from the sensor control circuit 209 responding to the request from the calibration execution control unit 303, and outputs the measurement result to the calibration execution control unit 303.

The image input unit 309 outputs the external input image signal, which the image input circuit 204 received from the PC 101, to the display control unit 306. The image input unit 309 also outputs an input detection signal to the input YES/NO detection unit 311 if the external input image signal from the PC 101 is detected. If the external input image signal from the PC 101 is not detected, the image input unit 309 outputs an input cancellation signal to the input YES/NO detection unit 311.

If a patch transmission request signal is transmitted from the calibration execution control unit 303, the PC communication unit 310 outputs the patch transmission request signal to the PC 101 via the image input circuit 204. The PC communication unit 310 also receives a patch transmission completion signal from the PC 101 via the image input circuit 204, and outputs the patch transmission completion signal to the calibration execution control unit 303.

The input YES/NO detection unit 311 determines whether an external input image signal is input from the PC 101 based on the input detection signal and input cancellation signal received from the image input unit 309, and stores the determination result as the input YES/NO information. In concrete terms, the input YES/NO detection unit 311 determines that an external input image signal is input during a period from the reception of the input detection signal to the reception of the input cancellation signal, and that an external input image signal is not input during the other periods. Then the input YES/NO detection unit 311 outputs the received input detection signal to the calibration execution control unit 303. In concrete terms, the input YES/NO detection unit 311 outputs the input detection signal at the timing when it is determined that the external input image signal is input. The input YES/NO detection unit 311 also outputs the input YES/NO information responding to the request from the calibration execution control unit 303.

The single unit display image display control unit 312 outputs an image transmission request signal to the network communication unit 313 according to the instruction from the UI unit 301, and acquires image file data from the network communication unit 313. The single unit display image display control unit 312 generates a single unit display image signal by decoding the acquired image file data. Then the single unit display image display control unit 312 performs image signal combining processing (e.g. icon combining processing) and image processing instructed by the user on the generated single unit display image signal if necessary, and outputs the processed single unit display image signal to the display control unit 306.

The network communication unit 313 transmits the image transmission request signal received from the single unit display image display control unit 312 to the image server 103 via the network communication circuit 212, and acquires the image file data from the image server 103. The network communication unit 313 outputs the acquired image file data to the single unit display image display control unit 312.

The processing of each functional block (UI unit 301 to network communication unit 313) illustrated in FIG. 3 is executed by the CPU 201.

Figure 4:
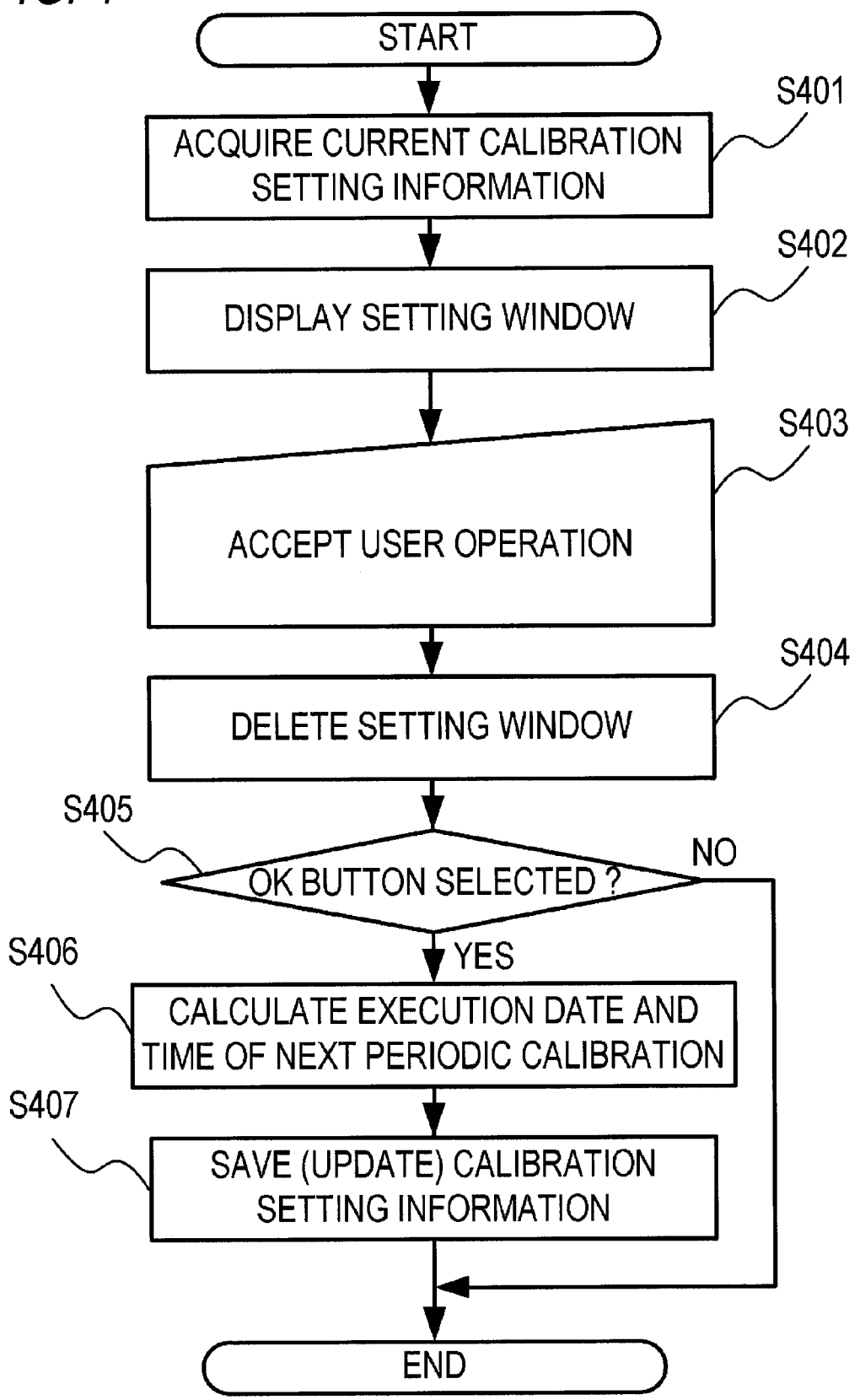
FIG. 4 is a flow chart depicting an example of the calibration setting information setting processing according to Example 1.

FIG. 4 is a flow chart depicting an example of the processing of the UI unit 301 (calibration setting information setting processing) when the user performs an operation to start setting the calibration setting information.

First the UI unit 301 acquires current calibration setting information from the calibration setting management unit 302 (S401).

Then the UI unit 301 generates a signal of the setting window and outputs the signal to the display control unit 306 (S402). The display control unit 306 generates a composite image signal by combining the signal of the setting window with the signal of the currently displayed image, and outputs the generated composite image signal. Thereby an image, in which the setting window is superimposed on the currently displayed image, is displayed.

Using the setting window, the user performs an operation to change the calibration setting information if necessary, and then performs an operation to complete setting of the calibration setting information (S403). Although details will be described later, the setting window of this example has an "OK" button and a "Cancel" button, and the setting of the calibration setting information is completed if the user selects one of these two buttons.

Responding to the selection of one of the two buttons (responding to the operation to complete the setting), the UI unit 301 deletes (closes) the setting window (S404).

If the OK button is selected in S403 (S405: YES), the UI unit 301 calculates the execution date and time of the next periodic calibration, based on the calibration setting information that is set (S406).

Then the UI unit 301 outputs the calibration setting information, including the execution date and time of the next periodic calibration calculated in S406, to the calibration setting management unit 302 (S407). Thereby the calibration setting information is saved (updated). Then the UI unit 301 ends the processing.

If the Cancel button is selected in S403 (S405: NO), the UI unit 301 ends the processing.

FIG. 5 illustrates an example of the setting window.

The setting window 501 has radio buttons 502 to 504, 510 and 511, a list box 505, text boxes 506 to 509, an OK button 512 and a Cancel button 513.

The radio buttons 502 to 504 are radio buttons to set one of: everyday, every week and every month, regarding frequency to execute the periodic calibration. The list box 505 is a list box to set a day of the week when the periodic calibration is executed. The text box 506 is a text box to set a date when the periodic calibration is executed. The text boxes 507 and 508 are text boxes to set a time when the periodic calibration is executed.

If the radio button 502 is selected, the periodic calibration is executed every day.

If the radio button 503 is selected, the list box 505 is enabled, and the periodic calibration is executed every week, on the day of the week selected in the list box 505.

If the radio button 504 is selected, the text box 506 is enabled, and the periodic calibration is executed every month on the date that is input in the text box 506.

The periodic calibration is executed at the time that is input in the text boxes 507 and 508.

In the case of FIG. 5, the periodic calibration is executed at 12:15 every day.

The text box 509 is a text box to set a target maximum brightness value when the periodic calibration is executed. In the case of FIG. 5, the target maximum brightness value when the periodic calibration is executed is set to 300 cd/m$^2$.

The radio buttons 510 and 511 are radio buttons to set a target gradation curve when the periodic calibration is executed. If the radio button 510 is selected, the target gradation curve is set to DICOM GSDF, and if the radio button 511 is selected, the target gradation curve is set to γ2.2. In the case of FIG. 5, the target gradation curve is set to DICOM GSDF. Details on the target gradation curve, which is not the point of the present invention, are omitted. The target maximum brightness value and the target gradation curve which are set are used not only when the periodic calibration is executed, but also when the single unit calibration and the link calibration are executed.

The OK button 512 and the Cancel button 513 are buttons to complete setting of the calibration setting information.

If the OK button 512 is selected, the calibration setting information displayed in the setting window is saved, and the setting of the calibration setting information is completed. At this time, the UI unit 301 is notified that the OK button is selected.

If the Cancel button 513 is selected, setting of the calibration setting information is completed without saving the calibration setting information displayed in the setting window. In other words, if setting of the calibration setting information is completed by selecting the Cancel button 513, changes of the execution frequency, target maximum brightness value or the like, which are performed after displaying the setting window, become invalid. At this time, the UI unit 301 is notified that the Cancel button is selected (that the OK button is not selected).

Figure 6A:
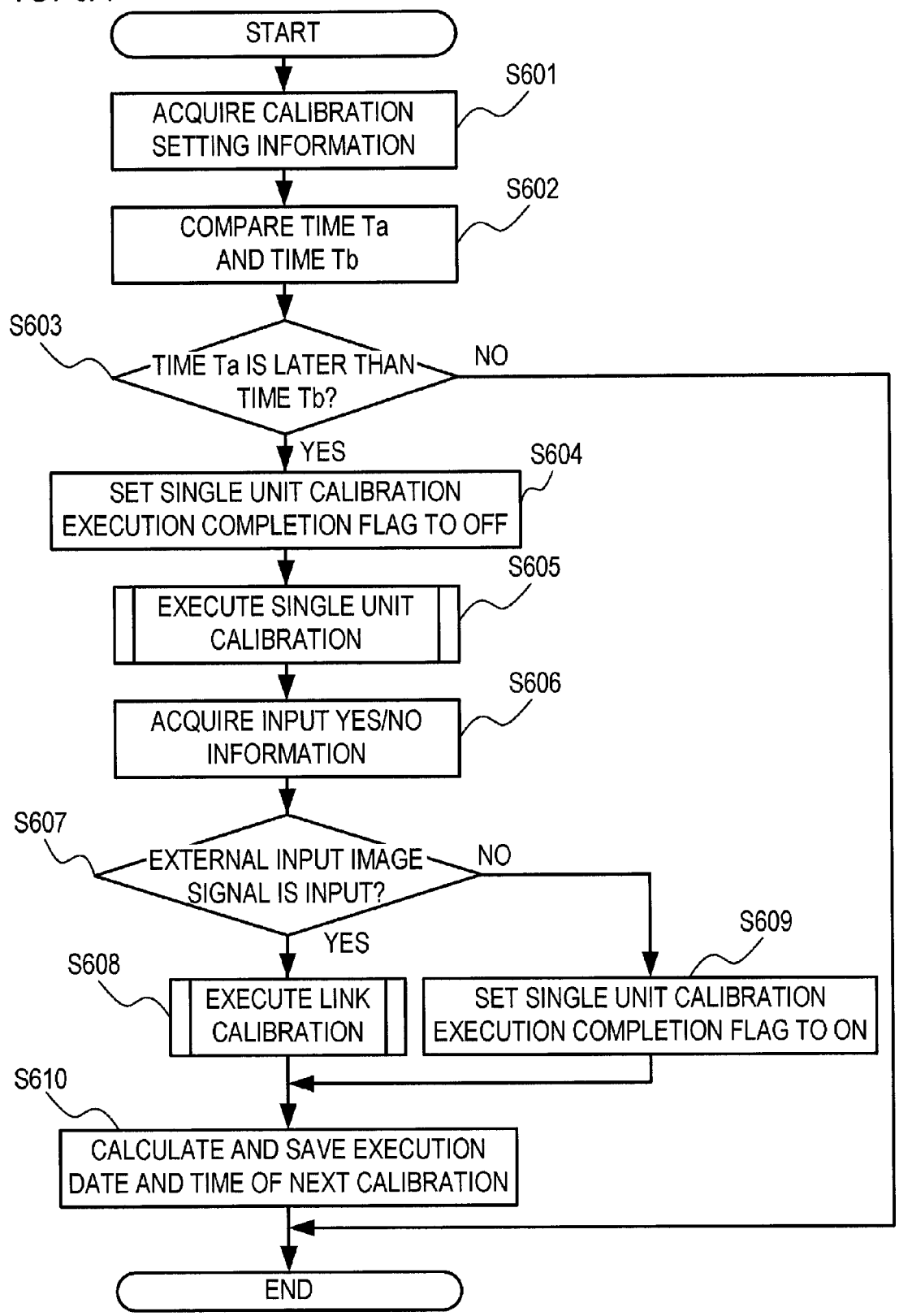
FIG. 6A and FIG. 6B are flowcharts depicting examples of the periodic calibration execution processing according to Example 1.
Figure 6B:
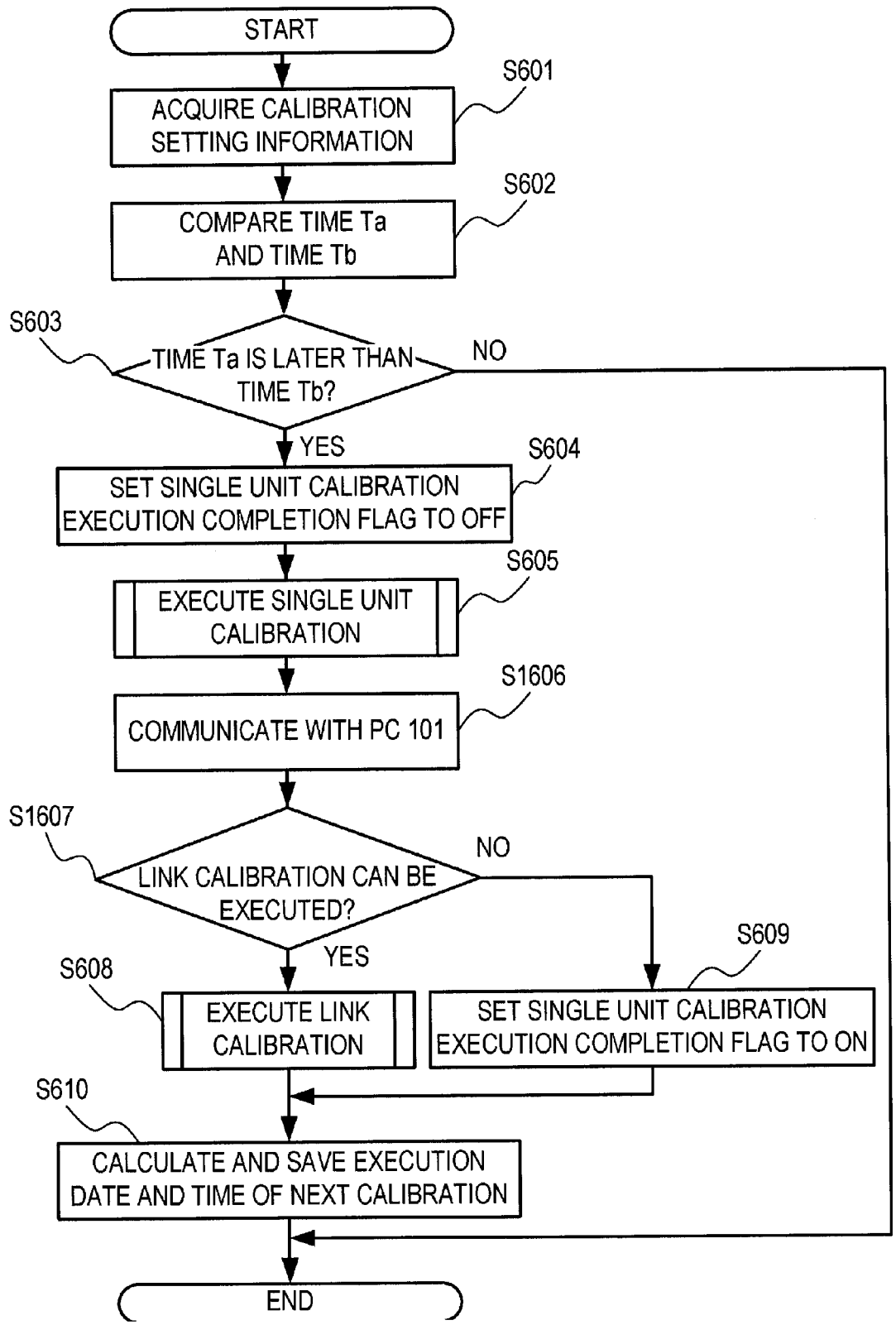

FIG. 6A is a flow chart depicting an example of the periodic calibration (periodic calibration execution processing) by the calibration execution control unit 303. The calibration execution control unit 303 periodically executes the processing in the flowchart in FIG. 6A after the display apparatus 100 is started up.

First the calibration execution control unit 303 acquires the calibration setting information from the calibration setting management unit 302 (S601).

Then the calibration execution control unit 303 compares the current time (time Ta) and the execution date and time of the next periodic calibration (time Tb) included in the calibration setting information acquired in S601 (S602).

If the current time is the execution date and time of the next periodic calibration or later (S603: YES), the calibration execution control unit 303 determines that the periodic calibration need be executed, and advances processing to S604. If the current time is before the execution date and time of the next periodic calibration (S603: NO), the calibration execution control unit 303 ends processing.

In S604, the calibration execution control unit 303 initializes the single unit calibration execution completion flag to OFF, and outputs the initialized flag to the calibration result management unit 305.

Then the calibration execution control unit 303 executes the single unit calibration (S605). The flow chart of the single unit calibration will be described later.

Then the calibration execution control unit 303 acquires the input YES/NO information from the input YES/NO detection unit 311 (S606).

If an external input image signal is input (S607: YES), the calibration execution control unit 303 executes the link calibration continuously (S608). The flowchart of the link calibration will be described later. If an external input image signal is not input (S607: NO), the calibration execution control unit 303 sets the single unit calibration execution completion flag to ON, and outputs the flag in the ON state to the calibration result management unit 305 (S609).

Finally (after S608 or S609), the calibration execution control unit 303 calculates the execution date and time of the next periodic calibration based on the calibration setting information. Then the calibration execution control unit 303 updates the execution date and time of the next periodic calibration included in the calibration setting information, and outputs the updated calibration setting information to the calibration setting management unit 302 (S610).

Instead of FIG. 6A, the processing in the flowchart in FIG. 6E may be performed. In concrete terms, the calibration execution control unit 303 communicates with the PC 101, which is the target of the link calibration, in S1606. Then in S1607, the calibration execution control unit 303 prompts the PC 101 whether the execution of the link calibration is possible, and determines whether the link calibration can be executed. For example, if the display apparatus 100 and the PC 101 are in a non-communicable state due to long distance, it is determined that the link calibration cannot be executed. If the display apparatus 100 and the PC 101 are in a communicable state, and the calibration execution control unit 303 receives a response from the PC 101 that the link calibration can be executed, and it is determined that execution of the link calibration is possible.

Figure 7:
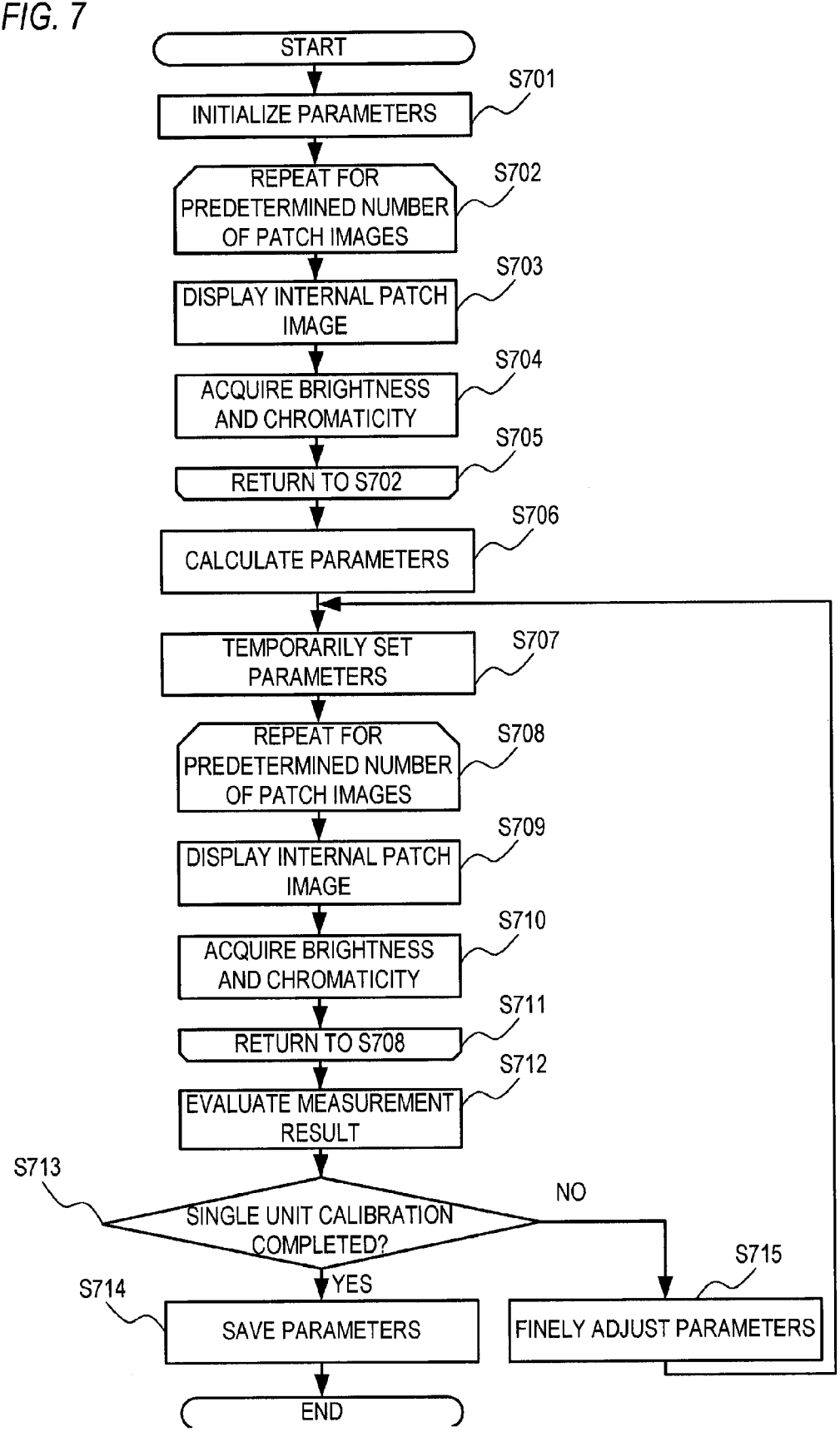
FIG. 7 is a flow chart depicting an example of the single unit calibration according to Example 1.

FIG. 7 is a flow chart depicting an example of the single unit calibration by the calibration execution control unit 303.

First the calibration execution control unit 303 requests the display control unit 306 to initialize the image quality adjustment parameter, and requests the backlight control unit 307 to initialize the backlight emission parameter (S701). As a result, the initial values of the parameters are used in the image processing circuit 205 and in the backlight control circuit 207 when the image is displayed.

Then the calibration execution control unit 303 repeats the processing in S703 to S705 for a predetermined number of patch images (S702).

First the calibration execution control unit 303 outputs an internal patch signal to the display control unit 306 (S703). The display control unit 306 generates a composite image signal by combining the received internal patch signal with the signal of the currently displayed image, and outputs the generated composite image signal. Thereby an image, in which the internal patch image is superimposed on the currently displayed image, is displayed. At this time, the calibration execution control unit 303 outputs a measurement request signal to the photometry unit 308. Thereby brightness and chromaticity of the internal patch image are measured by the brightness/chromaticity sensor 210, and the measurement result is acquired by the photometry unit 308.

Then the calibration execution control unit 303 acquires the brightness and chromaticity of the displayed internal patch image from the photometry unit 308 (S704).

Then processing returns to S702 (S705).

After the processing in S703 to S705 is repeated for the predetermined number of patch images, processing advances to S706.

In S706, the calibration execution control unit 303 calculates an image quality adjustment parameter and a backlight emission parameter based on the brightness and chromaticity of each of the acquired patch image, target maximum brightness value and target gradation curve.

Then the calibration execution control unit 303 outputs the image quality adjustment parameter and the backlight emission parameter calculated in S706 to the display control unit 306 and the backlight control unit 307 respectively. Thereby the parameters calculated in S706 are temporarily set, and an image is displayed using the temporarily set parameters (S707).

The calibration execution control unit 303 repeats the processing in S709 to S711 for the predetermined number of patch images (S708). The processing in S709 to S711 is the same as the processing in S703 to S705, and the description thereof is therefore omitted.

After processing in S709 to S711 is repeated for the predetermined number of patch images, processing advances to S712.

In S712, the calibration execution control unit 303 evaluates the measurement result (brightness and chromaticity) acquired in S710. In concrete terms, the calibration execution control unit 303 determines whether the brightness and chromaticity of each patch image acquired in S710 are within a predetermined error range from the values based on the target maximum brightness value and the target gradation curve (target values).

If all the measurement results of each patch image is within the predetermined error range from the target values, the calibration execution control unit 303 determines that the single unit calibration is completed (S713: YES), and processing advances to S714. In S714, the calibration execution control unit 303 outputs the image quality adjustment parameter and the backlight emission parameter calculated in S706 to the parameter management unit 304, and records these parameters as the parameters for a single unit display image (S714).

If there is a measurement result which is not within the predetermined error range from the target value, the calibration execution control unit 303 determines that the single unit calibration must continue (S713: NO), and processing advances to S715. In S715, the calibration execution control unit 303 finely adjusts the image quality adjustment parameter and the backlight emission parameter. Then processing returns to S707. If there is a measurement result is not within the predetermined error range from the target value, even if fine adjustment is performed for more than a predetermined number of times, it is determined that the single unit calibration is completed (S713: YES), and processing advances to S714.

Figure 8:
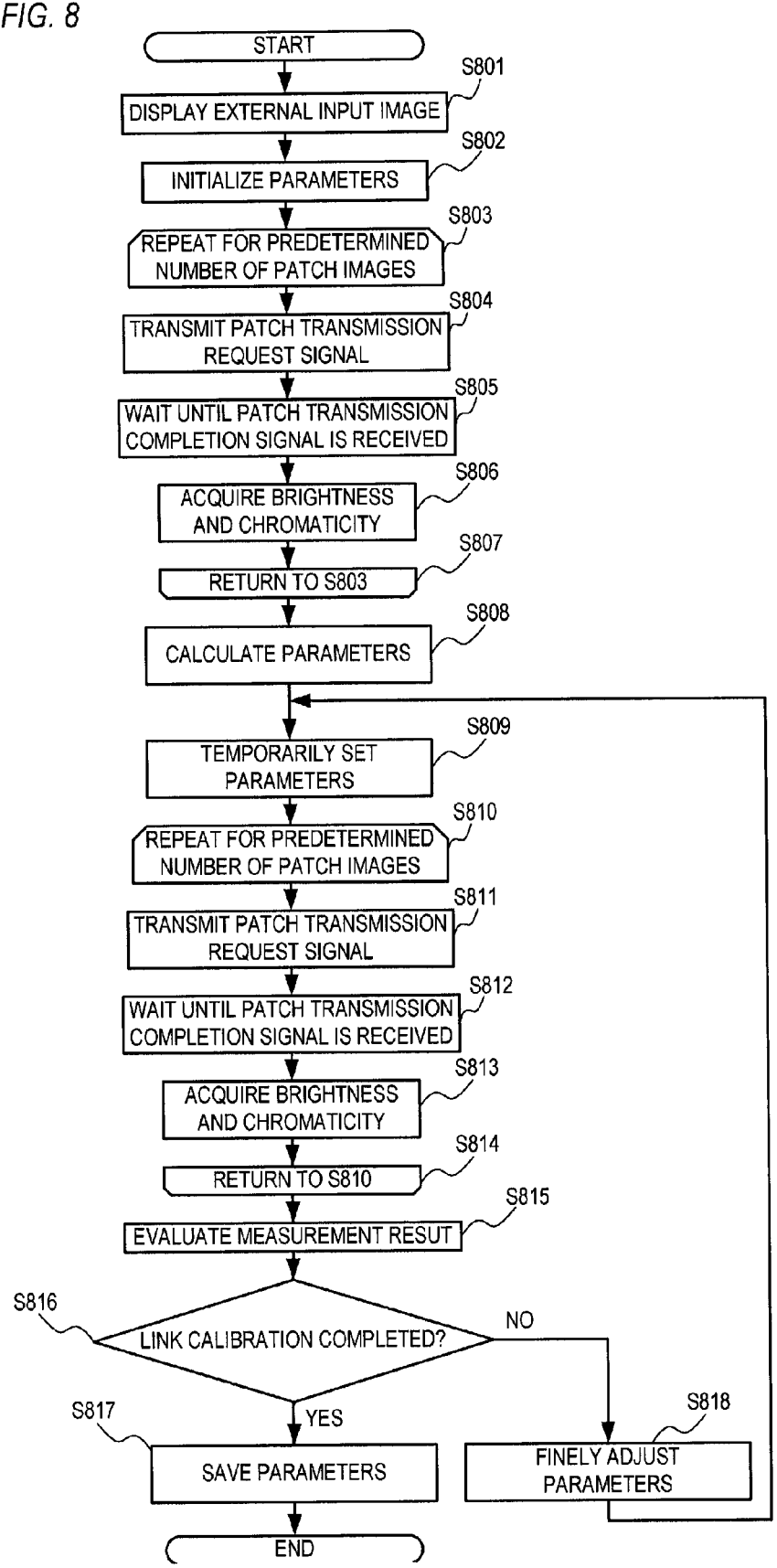
FIG. 8 is a flow chart depicting an example of the link calibration according to Example 1.

FIG. 8 is a flow chart depicting an example of the link calibration by the calibration execution control unit 303.

First the calibration execution control unit 303 requests the display control unit 306 to display an external input image based on the external input image signal which the image input unit 309 outputs (S801). When this request is received, the display control unit 306 selects the external input image signal which the image input unit 309 output, and outputs this external input image signal.

Here it is assumed that the display apparatus 100 stores the ID information of the PC 101, which is the target of the link calibration, in advance, in the memory 202 or in the non-volatile memory 203. The calibration execution control unit 303 reads the ID information stored in advance, communicates with the PC 101 which is the target of the link calibration, and transmits a request command to the display control unit 306.

Then just like the case of the single unit calibration, the calibration execution control unit 303 requests the display control unit 306 to initialize the image quality adjustment parameter, and requests the backlight control unit 307 to initialize the backlight emission parameter (S802). As a result, the initial values of the parameters are used in the image processing circuit 205 and the backlight control circuit 207 when the image is displayed.

Then the calibration execution control unit 303 repeats the processing in S804 to S807 for a predetermined number of patch images (S803).

First the calibration execution control unit 303 transmits a patch transmission request signal to the PC communication unit 310 (S804). Thereby the patch transmission request signal is transmitted from the PC communication unit 310 to the PC 101.

Then the calibration execution control unit 303 waits until the image input unit 309 receives an external patch signal from the PC 101, and the PC communication unit 310 receives a patch transmission completion signal from the PC 101 (S805). When reception of the external patch signal is completed, the patch transmission completion signal is received by the PC communication unit 310, and the patch transmission completion signal is transmitted from the PC communication unit 310 to the calibration execution control unit 303. In this case, an external input image signal to be output by the image input unit 309 (including an external patch signal) has been selected in the display control unit 306 (by the processing in S801). Therefore if an external patch signal is received from the PC 101, an external patch image based on the external patch image that is output from the PC 101 is displayed on the screen.

When the patch transmission completion signal is received, the calibration execution control unit 303 outputs a measurement request signal to the photometry unit 308. Thereby brightness and chromaticity of the external patch image are measured by the brightness/chromaticity sensor 210, and the measurement result is acquired by the photometry unit 308. Then the calibration execution control unit 303 acquires the brightness and chromaticity of the displayed external patch image from the photometry unit 308 (S806).

Then processing returns to S803 (S807).

After the processing in S804 to S807 is repeated for a predetermined number of patch images, processing advances to S808.

In S808, the calibration execution control unit 303 calculates an image quality adjustment parameter and a backlight emission parameter based on the brightness and chromaticity of each of the acquired patch images, target maximum brightness value and target gradation curve.

Then the calibration execution control unit 303 outputs the image quality adjustment parameter and the backlight emission parameter calculated in S808 to the display control unit 306 and the backlight control unit 307 respectively. Thereby the parameters calculated in S808 are temporarily set, and an image is displayed using the temporarily set parameters (S809).

The calibration execution control unit 303 repeats the processing in S811 to S814 for the predetermined number of patch images (S810). The processing in S811 to S814 is the same as the processing in S804 to S807, and the description thereof is therefore omitted.

After processing in S811 to S814 is repeated for the predetermined number of patch images, processing advances to S815.

In S815, the calibration execution control unit 303 evaluates the measurement result (brightness and chromaticity) acquired in S813. In concrete terms, the calibration execution control unit 303 determines whether the brightness and chromaticity acquired in S813 are within a predetermined error range from values based on the target maximum brightness value and the target gradation curve (target values).

If all the measurement results of each patch image are within the predetermined error range from the target values, the calibration execution control unit 303 determines that the link calibration is completed (S816: YES), and processing advances to S817. In S817, the calibration execution control unit 303 outputs the image quality adjustment parameter and the backlight emission parameter calculated in S808 to the parameter management unit 304, and records these parameters as the parameters for the external input image (S817).

If there is a measurement result which is not within the predetermined error range from the target value, the calibration execution control unit 303 determines that the link calibration must continue (S816: NO), and processing advances to S818. In S818, the calibration execution control unit 303 finely adjusts the image quality adjustment parameter and the backlight emission parameter. Then processing returns to S809. If there is a measurement result which is not within the predetermined error range from the target value even if fine adjustment is performed for more than a predetermined number of times, it is determined that the link calibration is completed (S816: YES), and processing advances to S817.

In this embodiment, it is determined that the calibration is completed when all the measurement results of each patch image are within a predetermined error range from the target values, but the present invention is not limited to this configuration. For example, it may be determined that the calibration is completed when a number of measurement results, which are within a predetermined error range from the target values, is a predetermined value or more (a predetermined ratio or more with respect to all the measurement results).

Figure 9:
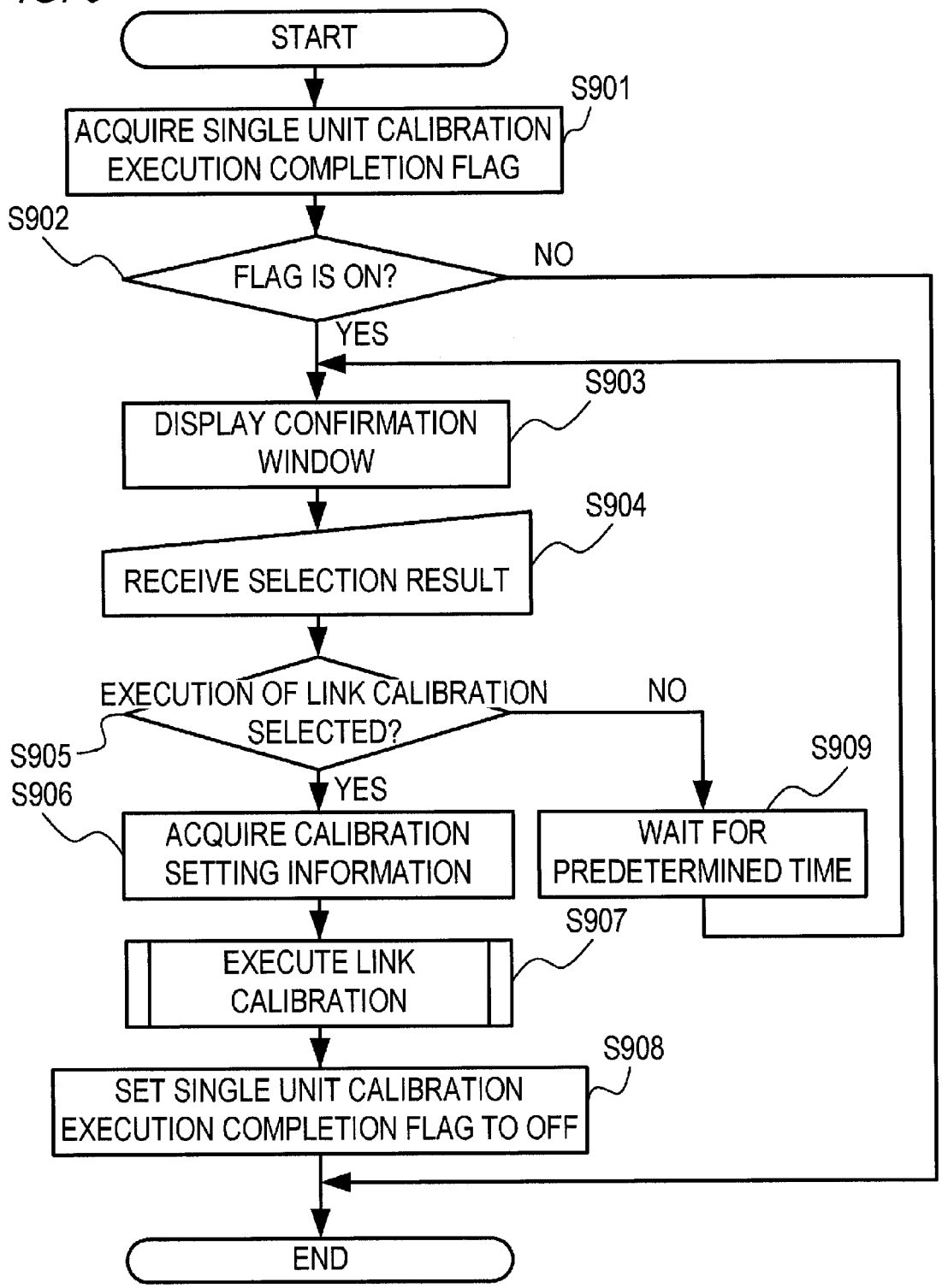
FIG. 9 is a flow chart depicting an example of non-periodic calibration execution processing according to Example 1.

FIG. 9 is a flow chart depicting an example of a non-periodic calibration execution processing that is executed by the calibration execution control unit 303 at a timing different from the timing of the periodic calibration execution processing. In concrete terms, the calibration execution control unit 303 performs the non-periodic calibration execution processing in FIG. 9 at a timing when an input detection signal is received (that is, at a timing when it is determined that an external input image signal is input).

First the calibration execution control unit 303 acquires a single unit calibration execution completion flag from the calibration result management unit 305 (S901).

If the single unit calibration execution completion flag acquired in S901 is ON (S902: YES), processing advances to S903. If the single unit calibration execution completion flag acquired in S901 is OFF (S902: NO), the calibration execution control unit 303 ends processing.

In S903, the calibration execution control unit 303 requests the UI unit 301 to display a confirmation window to confirm whether the user wants to execute link calibration. The UI unit 301 generates a signal for the confirmation window responding to this request, and outputs the signal to the display control unit 306. Then the display control unit 306 generates a composite image signal by combining the signal of the confirmation window with the signal of the currently displayed image, and outputs the generated composite image signal. Thereby an image, in which the configuration window is superimposed on the currently displayed image, is displayed. The user can select whether or not the link calibration is executed by operating the confirmation window.

Then the calibration execution control unit 303 receives, via the UI unit 301, the selection result on whether or not the link calibration is executed (S904).

If it is selected that the link calibration is executed (S905: YES), the calibration execution control unit 303 acquires the calibration setting information from the calibration setting management unit 302 (S906). Then the calibration execution control unit 303 executes the link calibration depicted in FIG. 8 (S907). Finally the calibration execution control unit 303 sets the single unit calibration execution completion flag to OFF, and outputs the flag in the OFF state to the calibration result management unit 305 (S908).

If it is selected that the link calibration is not executed (S905: NO), the calibration execution control unit 303 waits for a predetermined time (S909), and processing returns to S903.

Figure 10:
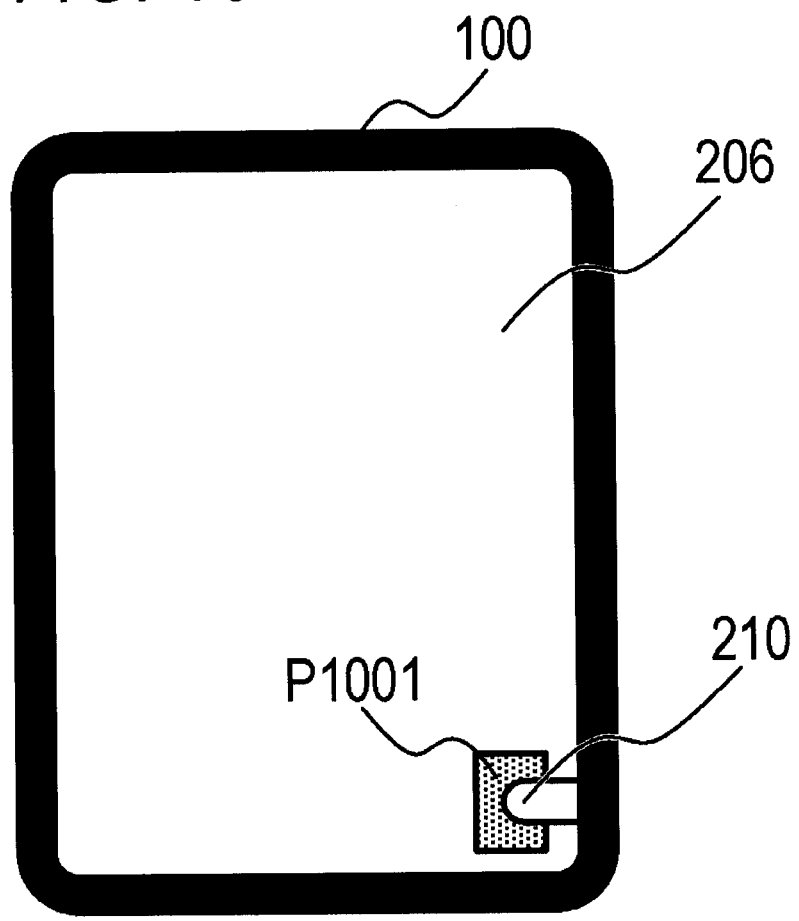
FIG. 10 illustrates an example of a display image when the calibration according to Example 1 is executed.

FIG. 10 illustrates an image of a display image of the display apparatus 100 when the single unit calibration and the link calibration are executed.

As FIG. 10 illustrates, when calibration is executed, a patch image P1001 is displayed near the brightness/chromaticity sensor 210, and brightness and chromaticity of the patch image are measured by the brightness/chromaticity sensor 210.

Figure 11:
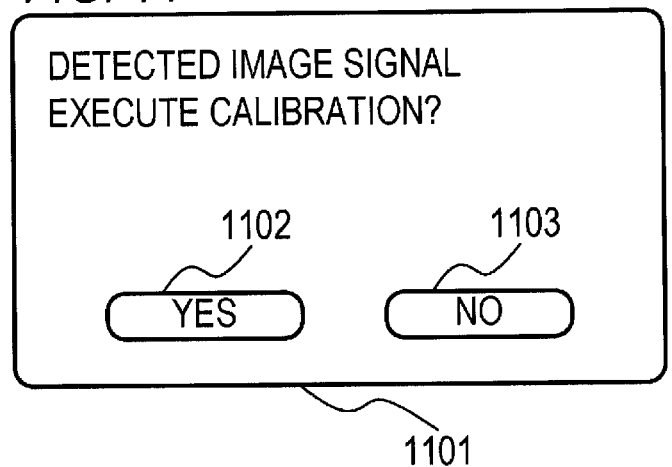
FIG. 11 illustrates an example of a confirmation window according to Example 1.

FIG. 11 illustrates an example of a confirmation window. The confirmation window 1101 has buttons 1102 and 1103 for selecting whether or not the link calibration is executed.

When the button 1102 is pressed by the user, it is determined that execution of the link calibration is selected in S905 in FIG. 9, and if the button 1103 is pressed, it is determined that non-execution of the link calibration is selected in S905 in FIG. 9.

As described above, according to this example, the single unit calibration is executed periodically. Even if the link calibration cannot be executed periodically, the link calibration is executed at an appropriate timing. In concrete terms, if only the single unit calibration is executed in the periodic calibration, the link calibration is executed during the period in which it is determined that an image signal from the external apparatus is input, before the next periodic calibration. In other words, the display characteristics of an image based on an image signal that is input from the external apparatus (external input image) and those of an image displayed on the monitor alone (single unit display image) can be calibrated at an appropriate timing. As a result, the display characteristics of the single unit display image and those of the external input image can be prevented from becoming different.

In this example, it is assumed that the target values of the calibration are acquired based on the target maximum brightness value and the target gradation curve, but the target values may be acquired using other values, such as color temperature. The target values upon executing the link calibration may be the result of the single unit calibration, instead of acquiring the target values from the calibration setting.

In this example, the user selects whether or not the link calibration is executed in the non-periodic calibration execution processing, but the present invention is not limited to this configuration. The link calibration may be executed automatically. For example, if only the single unit calibration is executed in the periodic calibration, the link calibration may be executed automatically at a timing when it is determined that an external input image signal is input, before the next periodic calibration. If this configuration is used, the external input image can be displayed with display characteristics the same as (similar to) the single unit display image with certainty.

Even if an external input image signal is input, the link calibration need not be executed if the external input image is not displayed. Hence if only the single unit calibration is execute din the periodic calibration, the link calibration may be executed responding to the user operation to display an image based on the image signal from the external apparatus in the period when it is determined that an image signal is input from the external apparatus, before the next periodic calibration. If this configuration is used, the external input image can be displayed with the display characteristics the same as (similar to) the single unit display image with certainty. The link calibration is not executed if the external input image is not displayed, so processing load can be decreased.

The external patch signal may be an image signal that represents only a patch image, or may be an image signal that represents an image which includes an image area other than the patch image (an image which includes the patch image in a part of the area of the image).

In this example, the display image is switched to the external input image upon executing the link calibration, but the present invention is not limited to this configuration. For example, just like the case of executing a single unit calibration (processing in S703), an image signal to represent only an external patch image (or external patch image and neighbor area thereof) may be input to the display control unit 306. The display control unit 306 may generate a composite image signal by combining the above mentioned image signal that is input with the signal of the currently displayed image, and output the composite image signal. In other words, an image, in which the external patch image is superimposed on the currently displayed image (e.g. single unit display image), may be displayed without switching the display image.

In this example, an image cable is used for transmitting signals other than the image signal (e.g. patch transmission request signal, patch transmission completion signal) between the display apparatus 100 and the PC 101, but signals other than the image signal may be transmitted using a communication cable that is different from the image cable. For example, signals other than an image signal may be transmitted using a USB (Universal Serial Bus) cable.

In this example, the display apparatus 100, the PC 101 and the image server 103 are interconnected via the network cable 104, but the display apparatus 100, the PC 101 and the image server 103 may be communicably connected by wireless.

In this example, the case when the display apparatus is a liquid crystal display apparatus was described, but the display apparatus is not limited to a liquid crystal display apparatus. The display apparatus may also be an organic EL display apparatus, or a plasma display apparatus, for example.

Example 2

According to this example, it is determined that whether or not the link calibration is executed depends on whether or not the link calibration was executed in the past. Description on the portion overlapping with Example 1 is omitted.

Figure 12:
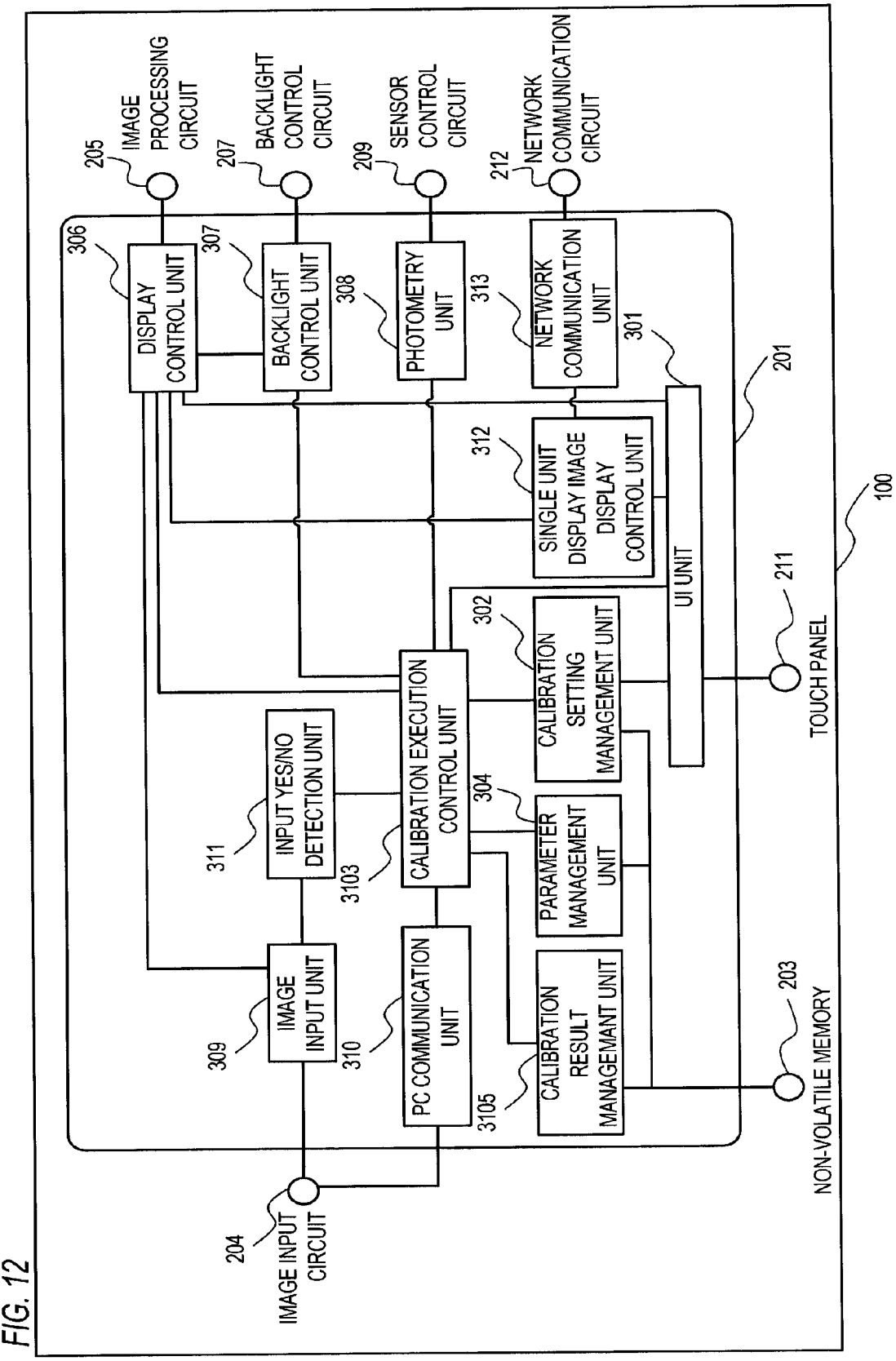
FIG. 12 is a functional block diagram depicting an example of the display apparatus according to Example 2.

FIG. 12 is a functional block diagram of the display apparatus according to this example. A functional block the same as Example 1 is denoted with a same reference numeral, for which description is omitted.

A calibration execution control unit 3103 has not only the function of the calibration execution control unit 303 in FIG. 3, but also a function to determine whether or not the link calibration is executed based on the execution date and time of the link calibration in the past (previous link calibration). In concrete terms, when the link calibration is executed, the calibration execution control unit 3103 acquires the execution date and time of the previous link calibration from a calibration result management unit 3105. Then the calibration execution control unit 3103 determines whether or not the link calibration is executed based on whether the link calibration was executed in a predetermined period in the past from the current time. Details on this determination processing will be described later.

Furthermore if the link calibration is executed, the calibration execution control unit 3103 outputs the execution date and time thereof to the calibration result management unit 3105.

The calibration result management unit 3105 not only has the function of the calibration result management unit 305 in FIG. 3, but also a function to read the above mentioned execution date and time from the non-volatile memory 203, and to write the above mentioned execution date and time to the non-volatile memory 203.

Figure 13:
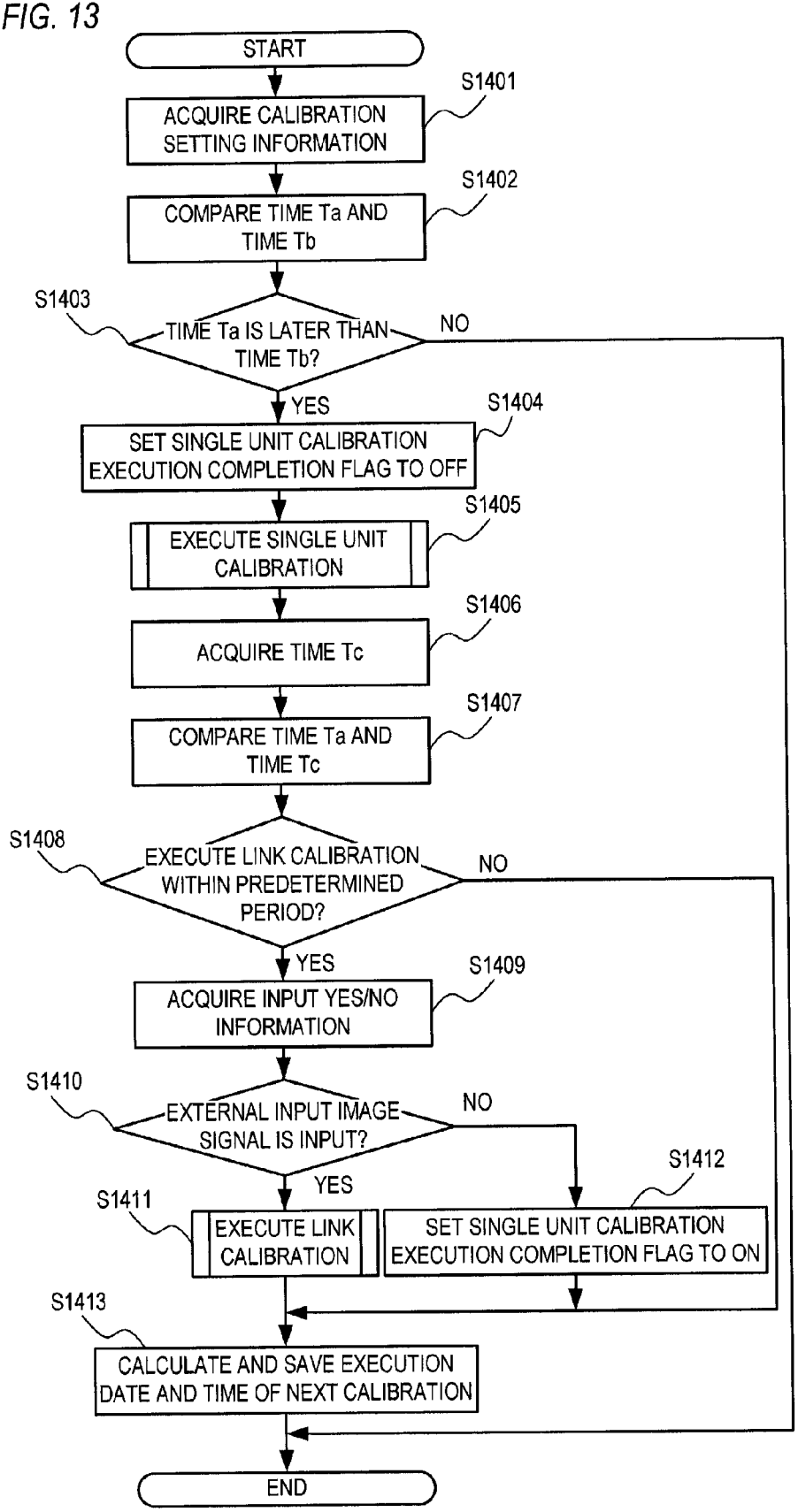
FIG. 13 is a flow chart depicting an example of the periodic calibration execution processing according to Example 2.

FIG. 13 is a flow chart depicting an example of the periodic calibration execution processing by the calibration execution control unit 3103. The calibration execution control unit 3103 periodically executes the processing in the flow chart in FIG. 13 after the display apparatus is started up.

First the calibration execution control unit 3103 acquires the calibration setting information from the calibration setting management unit 302 (S1401).

Then the calibration execution control unit 3103 compares the current time (time Ta) and the execution date and time of the next periodic calibration (time Tb) included in the calibration setting information acquired in S1401 (S1402).

If the current time is the execution date and time of the next periodic calibration or later (S1403: YES), the calibration execution control unit 3103 determines that the calibration need be executed, and advances processing to S1404. If the current time is before the execution date and time of the next periodic calibration (S1403: NO), the calibration execution control unit 3103 ends processing.

In S1404, the calibration execution control unit 3103 initializes the single unit calibration execution completion flag to OFF, and outputs the initialized flag to the calibration result management unit 3105. Then the calibration execution control unit 3103 executes the single unit calibration in FIG. 7 (S1405).

Then the calibration execution control unit 3103 acquires the execution date and time of the previous link calibration (time Tc) from the calibration result management unit 3105 (S1406). If the link calibration has never been executed, this execution date and time is not acquired.

Then the calibration execution control unit 3103 compares the current time (time Ta) and the execution date and time acquired in S1406 (execution date and time of previous link calibration: time Tc) (S1407).

If the link calibration was executed in a predetermined period in the past from the current time (S1408: YES), the calibration execution control unit 3103 determines that the link calibration need be executed, and advances processing to S1409. If the link calibration was not executed in the predetermined period in the past from the current time (S1408: NO), on the other hand, the calibration execution control unit 3103 determines that the link calibration need not be executed, and advances processing to S1413. In other words, if the difference between the current time and the time when the link calibration was executed the last time is a predetermined time or more upon executing the periodic calibration, only the single unit calibration is executed.

In S1409, the calibration execution control unit 3103 acquires the input YES/NO information from the input YES/NO detection unit 311.

If an external input image signal is input (S1410: YES), the calibration execution control unit 3103 executes the link calibration continuously (S1411). The flow chart of the link calibration will be described later. If an external input image signal is not input (S1410: NO), the calibration execution control unit 3103 sets the single unit calibration execution completion flag to ON, and outputs the flag in the ON state to the calibration result management unit 3105 (S1412).

Finally (after S1411 or S1412), the calibration execution control unit 303 calculates the execution date and time of the next periodic calibration based on the calibration setting information. Then the calibration execution control unit 3103 updates the execution date and time of the next periodic calibration included in the calibration setting information, and outputs the updated calibration setting information to the calibration setting management unit 302 (S1413).

Figure 14:
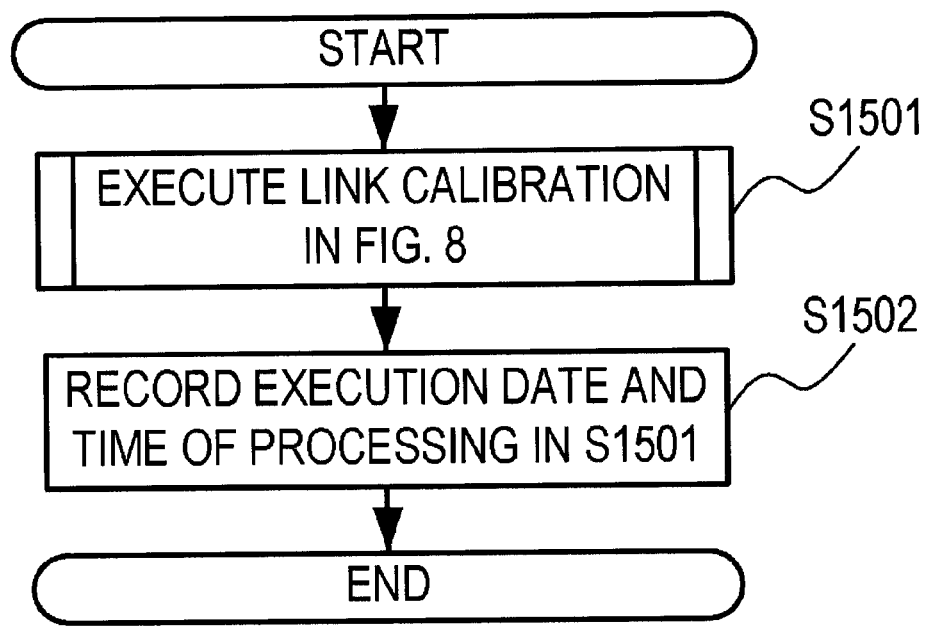
FIG. 14 is a flow chart depicting an example of the link calibration according to Example 2.

FIG. 14 is a flow chart depicting an example of the link calibration by the calibration execution control unit 3103.

First the calibration execution control unit 3103 performs various processings according to the flow in FIG. 8 (S1501). In other words, the calibration execution control unit 3103 executes the link calibration of Example 1.

Then the calibration execution control unit 3103 outputs the execution date and time of the processing in S1501 (that is, the current time) to the calibration result management unit 3105 as the execution date and time of the link calibration (S1502). Thereby the execution date and time of the processing in S1501 is recorded in the non-volatile memory 203 as the execution date and time of the previous link calibration (the execution date and time of the previous link calibration is updated).

As described above, according to this example, the link calibration is executed depending on whether or not the link calibration was executed in the past. In concrete terms, upon executing the periodic calibration, only the single unit calibration is executed if the difference between the current time and the time when the link calibration was executed last time is a predetermined time or more. If the time when the link calibration was executed the last time is a predetermined time or more before the current time, it is very likely that the display apparatus is being used in standalone status. If the display apparatus is being used in standalone status, the link calibration is unnecessary, since an external input image is not displayed. In this example, the link calibration to be executed in the periodic calibration is omitted if it is very likely that the display apparatus is being used in standalone status, hence processing load can be decreased.

Example 3

In this example, a case of another apparatus instructing the display apparatus to execute the periodic calibration will be described. Specifically, a case of a management server instructing the display apparatus to execute the periodic calibration will be described. Description on the portion overlapping with Examples 1 and 2 is omitted.

Figure 15:
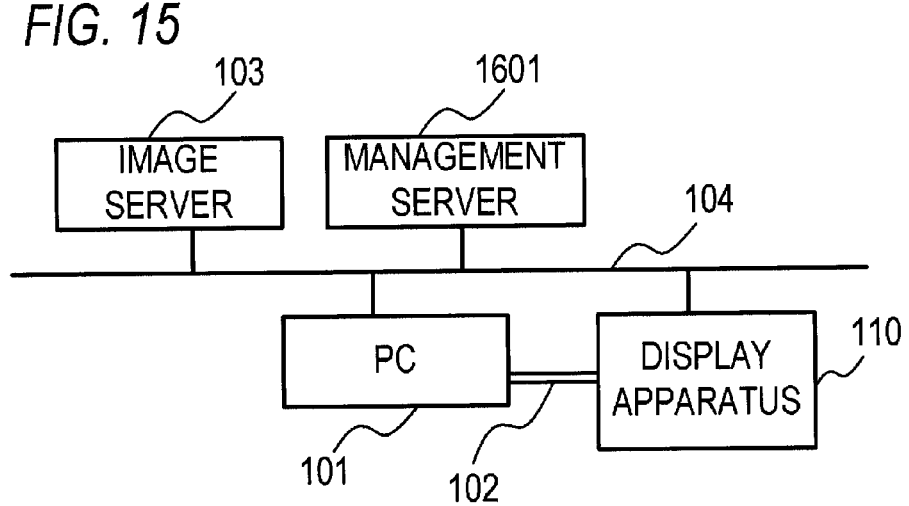
FIG. 15 illustrates an example of a display system according to Example 3.

FIG. 15 illustrates an example of a display system according to this example. As FIG. 15 illustrates, the display system according to this example has a management server 1601 in addition to the configuration in FIG. 1.

The management server 1601 is connected to the display apparatus 110 using the network cable 104. The management server 1601 transmits a calibration execution request signal to the display apparatus 110 according to the operation of the user (user of the management server). The calibration execution request signal is a signal to request execution of calibration. The management server 1601 also transmits the calibration setting information as well, upon transmitting the calibration execution request signal.

The user of the management server 1601 periodically (according to a predetermined schedule) carries out an operation for transmitting the calibration execution request signal to the display apparatus 110, for example.

Figure 16:
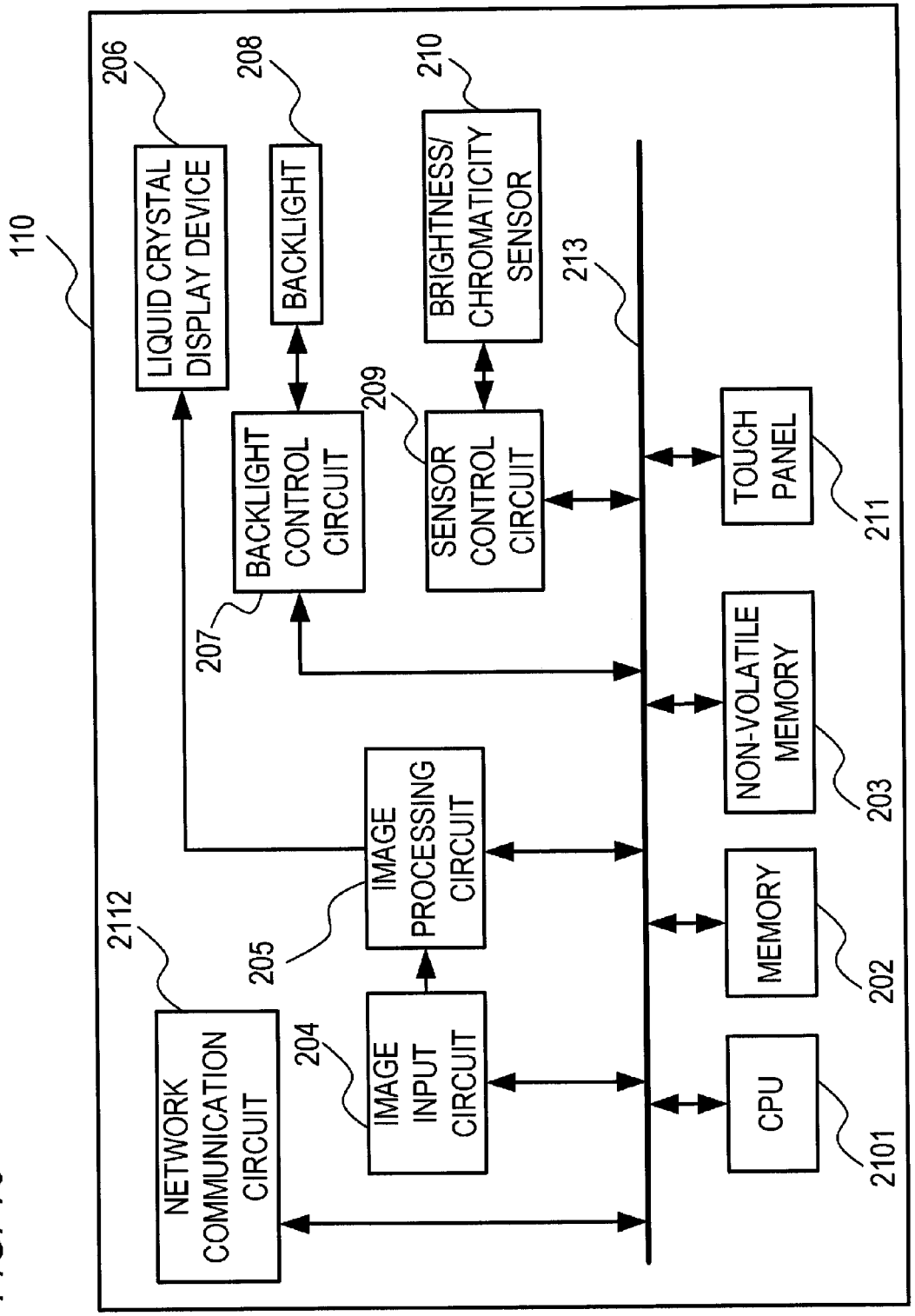
FIG. 16 is a hardware block diagram depicting an example of the display apparatus according to Example 3.

FIG. 16 is an example of a hardware block diagram of the display apparatus 110. A hardware block the same as Example 1 is denoted with a same reference numeral, for which description is omitted.

In the CPU 201 in FIG. 2, the periodic calibration is executed based on the calibration setting information recorded in the non-volatile memory 203. In a CPU 2101, on the other hand, the periodic calibration is executed responding to the reception of the calibration execution request signal from the management server 1601. In this case, the calibration execution request signal is received via a network communication circuit 2112. In addition to this function, the CPU 2101 has the same function as the CPU 201.

The network communication circuit 2112 has not only the function of the network communication circuit 212 in FIG. 2, but also the function to receive a calibration execution request signal from the management server 1601, and transmit the calibration execution request signal to the CPU 201.

Figure 17:
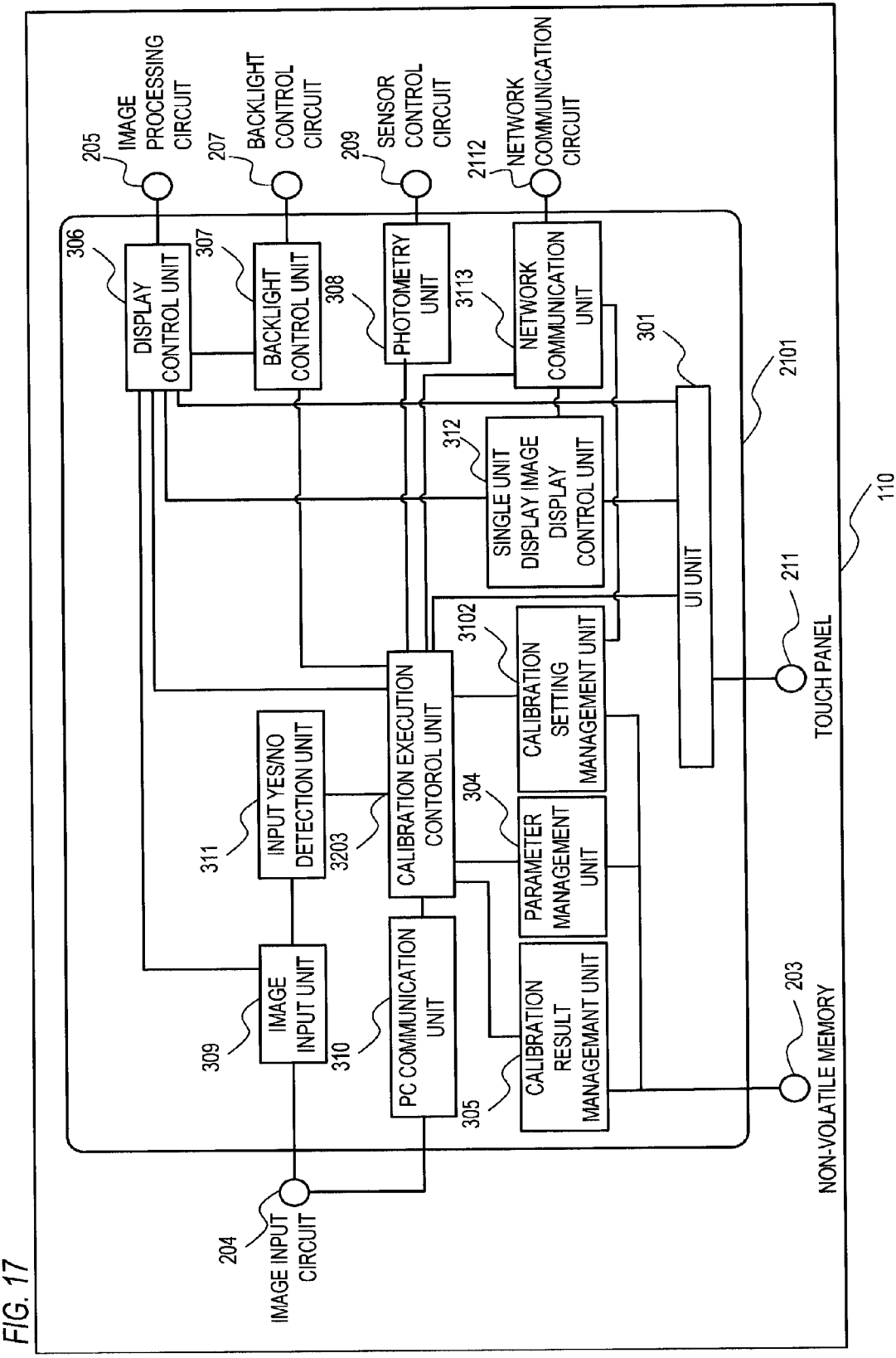
FIG. 17 is a functional block diagram depicting an example of the display apparatus according to Example 3.

FIG. 17 is a functional block diagram of the display apparatus 110.

A calibration setting management unit 3102 reads the calibration setting information from the non-volatile memory 203 responding to the request from a calibration execution control unit 3203, and outputs the calibration setting information to the calibration execution control unit 3203. The calibration setting management unit 3102 also records (overwrites) the calibration setting information received from the management server 1601 via a network communication unit 3113 in the non-volatile memory 203.

In the calibration execution control unit 303 in FIG. 3, the periodic calibration is executed according to the schedule which is set by the user. The calibration execution control unit 3203, on the other hand, executes the periodic calibration responding to the reception of the calibration execution request signal. In addition to this function, the calibration execution control unit 3203 has the same function as the calibration execution control unit 303.

The network communication unit 3113 receives a calibration execution request signal and calibration setting information from the management server 1601. The network communication unit 3113 outputs the received calibration execution request signal to the calibration execution control unit 3203, and outputs the received calibration setting information to the calibration setting management unit 3102. In addition to this function, the network communication unit 3113 has the same function as the network communication unit 313 in FIG. 3.

The processings of the calibration setting management unit 3102, the calibration execution control unit 3203, the network communication unit 3113, and the UI unit 301 to the single unit display image display control unit 312 in FIG. 17 are executed by the CPU 2101.

Figure 18:
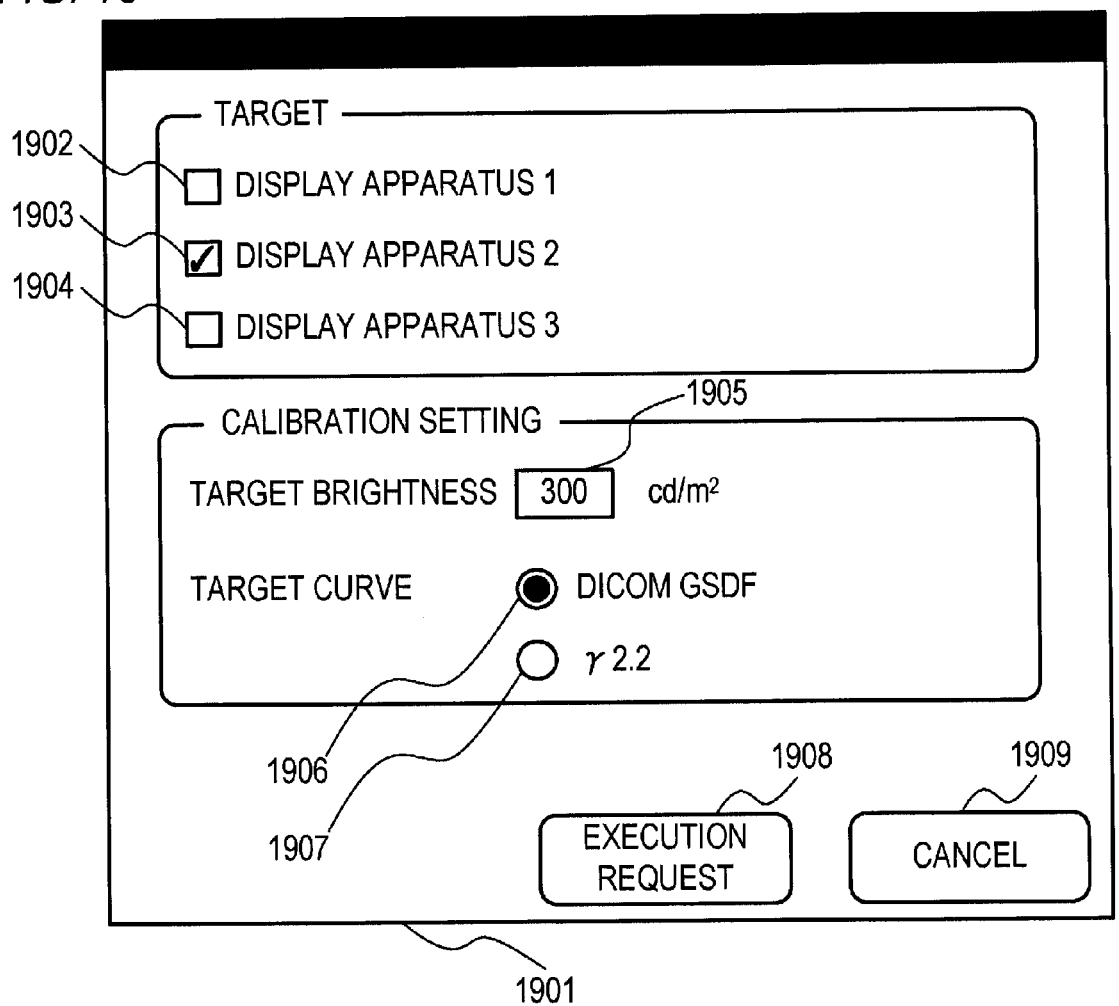
FIG. 18 illustrates an example of the calibration execution request image according to Example 3.

FIG. 18 illustrates an example of an image displayed on the management server (calibration execution request image) when the calibration setting information and the calibration execution request signal are transmitted.

The calibration execution request image 1901 has check boxes 1902 to 1904, a text box 1905, radio buttons 1906 and 1907, an execution request button 1908 and a cancel button 1909.

The check boxes 1902 to 1904 are check boxes to set a target display apparatus to which the calibration execution request signal is transmitted. The target display apparatus to which the calibration execution request signal is transmitted is the display apparatus 1 if the check box 1902 is selected, the display apparatus 2 if the check box 1903 is selected, and the display apparatus 3 if the check box 1904 is selected. In the case of FIG. 18, the display apparatus 2 is the target display apparatus to which the calibration execution request signal is transmitted.

The text box 1905 is a text box to set the target maximum brightness upon executing calibration. In the case of FIG. 18, setting of the target maximum brightness value upon executing calibration is 300 cd/m$^2$.

The radio buttons 1906 and 1907 are radio buttons to set the target gradation curve upon executing calibration. If the radio button 1906 is selected, the target gradation curve is set to DICOM GSDF, and if the radio button 1907 is selected, the target gradation curve is set to γ2.2. In the case of FIG. 18, setting of the target gradation curve is DICOM GSDF. Details on the target gradation curve, which is not the point of the present invention, are omitted.

The execution request button 1908 is a button which the user selects when the calibration execution request signal and the calibration setting information are transmitted to the transmission target display apparatus. If the user selects the execution request button 1908, the management server transmits the calibration setting information and the calibration execution request signal to the display apparatus selected as the transmission target. Thereby the periodic calibration based on the calibration setting information being set is executed in the transmission target display apparatus.

The cancel button 1909 is a button which the user selects when the calibration execution request signal and the calibration setting information are not transmitted. If the user selects the cancel button 1909, the management server deletes (closes) the calibration execution request image without transmitting the calibration execution request signal and the calibration setting information.

The calibration execution request image may be periodically displayed according to a predetermined schedule, or may be displayed according to the operation of the user of the management server.

In the example in FIG. 9, the calibration setting information and the calibration execution request signal are transmitted every time the execution request button 1908 is selected, but the present invention is not limited to this configuration. For example, the transmission schedule to transmit the calibration setting information and the calibration execution request signal (that is, the execution schedule of the periodic calibration) may be set by operating the calibration execution request image.

In the example in FIG. 9, the information on the target values (target gradation curve and target maximum brightness value) are transmitted as the calibration setting information, but the calibration setting information may also include information other than the target values. For example, if the above mentioned transmission schedule can be set, information on this transmission schedule may be included in the calibration setting information. Thereby the execution schedule of the periodic calibration can be confirmed by the display apparatus.

FIG. 19 is a flow chart depicting an example of the periodic calibration execution processing by the calibration execution control unit 3203.

First the calibration execution control unit 3203 acquires the calibration setting information from the calibration setting management unit 3102 (S2001).

Then the calibration execution control unit 3203 initializes the single unit calibration execution completion flag to OFF, and outputs the flag in the OFF state to the calibration result management unit 305 (S2002).

Then the calibration execution control unit 3203 executes the single unit calibration in FIG. 7 (S2003).

Then the calibration execution control unit 3203 acquires the input YES/NO information from the input YES/NO detection unit 311 (S2004).

If an external input image signal is input (S2005: YES), the calibration execution control unit 3203 continuously executes the link calibration in FIG. 8 (S2006). If an external input image signal is not input (S2005: NO), the calibration execution control unit 3203 sets the single unit calibration execution completion flag to ON, and outputs the flag in the ON state to the calibration result management unit 305 (S2007).

As described above, according to this example, the display characteristics of a single unit display image and those of an external input image can be calibrated at an appropriate timing just like Example 1, even if another apparatus instructs execution of the periodic calibration. As a result, the display characteristics of the single unit display image and those of the external input image can be prevented from becoming different.

In this example, the image server 103 and the management server 1601 are separate apparatuses, but the image server 103 and the management server 1601 may be a same apparatus.

In this example, a case when the management server 1601 instructs the display apparatus 100 to execute the periodic calibration was described, but an apparatus other than the management server 1601 may instruct to execute the periodic calibration. Any apparatus other than the display apparatus 110 may instruct to execute the periodic calibration. For example, the PC 101 may instruct to execute the periodic calibration.

Upon executing the periodic calibration, it may be determined whether or not the link calibration is executed depending on whether or not the link calibration was executed in the past, just like Example 2. Then processing load can be decreased just like Example 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-145642, filed on Jun. 30, 2011, and Japanese Patent Application No. 2012-088659, filed on Apr. 9, 2012, which are hereby incorporated by reference herein in their entirety.

What is claimed is:

1. A display apparatus that can execute single unit calibration that is performed by displaying an image stored in the display apparatus in advance, and link calibration that is performed by displaying an image based on an image signal which is input from an external apparatus, comprising:
    an execution unit that performs periodic calibration in which the single unit calibration and the link calibration are periodically executed; and
    a determination unit that determines whether an image signal from the external apparatus is input or not, wherein
    the execution unit executes the link calibration during a period in which the determination unit determines that an image signal from the external apparatus is input, when the link calibration could not be executed during the periodic calibration.

2. The display apparatus according to claim 1, wherein when only the single unit calibration is executed in the periodic calibration, the execution unit executes the link calibration at a timing when the determination unit has determined that an image signal from the external apparatus is input, before next periodic calibration.

3. The display apparatus according to claim 1, wherein when only the single unit calibration is executed in the periodic calibration, the execution unit executes the link calibration responding to user operation to display an image based on an image signal from the external apparatus, during the period in which the determination unit determines that an image signal from the external apparatus is input, before next periodic calibration.

4. The display apparatus according to claim 1, wherein when the periodic calibration is executed, the execution unit executes only single unit calibration in a case where a difference between the current time and the time when the link calibration has been executed the last time is a predetermined time or more.

5. The display apparatus according to claim 1, wherein execution of the periodic calibration is instructed by another apparatus.

6. A method for controlling a display apparatus that can execute single unit calibration that is performed by displaying an image stored in the display apparatus in advance, and link calibration that is performed by displaying an image based on an image signal which is input from an external apparatus, the method comprising:
 an execution step of performing periodic calibration in which the single unit calibration and the link calibration are periodically executed; and
 a determination step of determining whether an image signal from the external apparatus is input or not, wherein
 in the execution step, the link calibration is executed during the period in which determination is made that an image signal from the external apparatus is input in the determination step, when the link calibration could not be executed during the periodic calibration.

7. The method for controlling a display apparatus according to claim 6, wherein
 when only the single calibration is executed in the periodic calibration in the execution step, the link calibration is executed at a timing when determination is made that an image signal from the external apparatus is input in the determination step, before next periodic calibration.

8. The method for controlling a display apparatus according to claim 6, wherein
 when only the single calibration is executed in the periodic calibration in the execution step, the link calibration is executed responding to user operation to display an image based on an image signal from the external apparatus, during the period in which determination is made that an image signal from the external apparatus is input in the determination step, before next periodic calibration.

9. The control method for a display apparatus according to claim 6, wherein
 when the periodic calibration is executed in the execution step, only the single unit calibration is executed in a case where a difference between the current time and the time when the link calibration has been executed the last time is a predetermined time or more.

10. The control method for the display apparatus according to claim 6, wherein
 execution of the periodic calibration is instructed by another apparatus.

\* \* \* \* \*